(12) United States Patent
Stieber et al.

(10) Patent No.: US 7,205,348 B2
(45) Date of Patent: Apr. 17, 2007

(54) RUBBER COMPOSITION AND METHOD OF MAKING SAME

(75) Inventors: Joseph F. Stieber, Prospect, CT (US); Martin J. Hannon, Bethany, CT (US); L. P. Felipe Chibante, Houston, TX (US); James R. Korte, Katy, TX (US); Frank E. Welsh, Sugarland, TX (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 336 days.

(21) Appl. No.: 10/819,691

(22) Filed: Apr. 7, 2004

(65) Prior Publication Data

US 2004/0192852 A1    Sep. 30, 2004

Related U.S. Application Data

(63) Continuation of application No. 10/129,230, filed as application No. PCT/US00/41920 on Nov. 6, 2000, now abandoned.

(60) Provisional application No. 60/163,585, filed on Nov. 5, 1999.

(51) Int. Cl.
*A61K 8/81* (2006.01)

(52) U.S. Cl. ....................... 524/280; 106/473; 523/351

(58) Field of Classification Search ................ 524/280; 106/473; 523/351
See application file for complete search history.

(56) References Cited

U.S. PATENT DOCUMENTS

| 2,453,689 A | 11/1948 | Beaver |
| 2,462,572 A | 2/1949 | Throdahl |
| 4,695,609 A | 9/1987 | Stevenson |
| 4,764,547 A | 8/1988 | Hatanaka et al. |

FOREIGN PATENT DOCUMENTS

| DE | 223 720 A1 | 6/1985 |
| EP | 0 941 872 B1 | 8/2003 |
| WO | PCT/US00/41920 | 3/2001 |
| WO | PCT/US00/41920 | 1/2002 |

*Primary Examiner*—Peter D. Mulcahy
(74) *Attorney, Agent, or Firm*—Cook, Alex, McFarron, Manzo, Cummings & Mehler Ltd.

(57) ABSTRACT

Process of producing unvulcanized rubber useful for producing vulcanized rubber with improved hysteresis, which comprises mixing a composition comprising unvulcanized rubber, carbon black and xanthogen polysulfide at an elevated temperature in a non-productive stage and composition suitable for producing unvulcanized rubber useful for producing vulcanized rubber with improved hysteresis, which comprises unvulcanized rubber, a filler comprising carbon black and xanthogen polysulfide.

18 Claims, 4 Drawing Sheets

RUBBER COMPOSITION AND METHOD OF MAKING SAME

CROSS-REFERENCE TO RELATED APPLICATIONS

This is a continuation of U.S. application Ser. No. 10/129,230, filed Aug. 22, 2002, as a national stage application of International Application No. PCT/US00/41920, filed Nov. 6, 2000, which claims the benefit of U.S. Provisional Application No. 60/163,585, filed on Nov. 5, 1999.

DESCRIPTION OF THE INVENTION

Xanthogen polysulfides, such as xanthogen disulfides (dialkylthioperoxy dicarbonates), referred to hereinafter as "XDS", have been found by us to function as effective promoters of interaction between carbon black and rubber. Mixing rubber and carbon black prior to vulcanization increases this interaction. Once the rubber, xanthogen and carbon black have been mixed, the remaining ingredients are added, and the uncured rubber is sheeted out or molded and heated to curing temperature.

BACKGROUND OF THE INVENTION

Fillers, such as carbon black are added to elastomeric compounds for a variety of reasons. They act as a low cost diluent and as reinforcing agents, giving higher modulus, higher strength and greater wear resistance. The interaction between filler and an elastomer matrix is also very important to the enhancement of desirable compound properties such as hysteresis and abrasion resistance as well as tire properties such as rolling resistance and treadwear (see FIG. 5). It is believed that when the interaction between the carbon black filler and the polymer matrix is increased that dynamic properties are improved. This is generally evidenced by lower hysteresis at elevated temperatures that would result in lower rolling resistance when the rubber is used to make automobile tires. Increased interaction between the polymer and filler can also result in cured rubber with lower heat build-up. Interaction of rubber to the filler also results in changes in other properties. When rubber and carbon black interact, the amount of bound rubber increases. This is due to some of the polymer being strongly bonded to the surface of the carbon black. This is demonstrated by dissolving the uncured rubber in a good solvent, leaving the carbon black and bound polymer as a gel. In the absence of interaction, this quantity of gel will be minimal, and when interaction increases the amount of gel will increase. The increase in the amount of bound rubber gel in the uncured compound is generally taken as evidence of increased interaction between the filler and polymer (see FIG. 1).

In the absence of interaction between filler and its elastomeric matrix, the filler forms a loosely bonded network within the matrix, which remains after curing. When the dynamic storage modulus, designated G', is measured in the cured rubber sample, the filler network acts to increase the modulus at low strain. As the applied strain on the rubber sample is increased, the bonds that form this filler network are broken, and it no longer contributes to the modulus. Thus, in the presence of small or low interaction between filler and the elastomer matrix, the dynamic storage modulus G', will diminish as the applied strain is increased. This is known as the Payne Effect. As the filler to polymer matrix interaction increases, the filler—filler network should be decreased in the final cured elastomer. Thus when applied strain is increased as the dynamic measurement is made, the storage modulus, G', does not decrease as rapidly with an increase in the strain. The diminution of the Payne Effect is also taken as evidence that increased filler—polymer interaction has taken place (see FIG. 4). Another way to measure this is by the % G' Retained which is simply the ratio of low strain/high strain, where higher is better.

Similarly, when the modulus of a cured sample is measured in simple extension, the modulus will increase as the strain increases. When a sample that has increased filler interaction to the matrix is compared to a control, the ratio of the modulus at high strain to the modulus at low strain will be higher. Thus, an increase in the ratio of the modulus at 300% extension to the modulus at 5% extension, ($M_{300}/M_5$), may be taken as evidence that additional interaction has taken place. Thus this ratio, known as the reinforcement factor, is a measure of increased polymer-filler interaction (see FIG. 2).

In the past some chemicals have been added to rubber to improve the interaction of carbon black with the rubber matrix. For example N-methyl-N, 4-dinitrosoaniline was used, but it was discontinued due to its toxicity. Benzofurazan oxides have also been reported to be effective coupling agents, but upon curing they evolve an undesirable odor. Xanthogen polysulfides have been known to the rubber industry for some time. They have been used as a source of sulfur in vulcanization or as ultra accelerators for sulfur vulcanization. For example, Stevenson U.S. Pat. No. 4,695,609 points out that "U.S. Pat. No. 1,634,924, U.S. Pat. No. 2,374,385 and U.S. Pat. No. 2,453,689 each disclose the use of dihydrocarbyl xanthogen polysulfides as accelerators in rubber compositions. It is stated in U.S. Pat. No. 1,634,924 (and proved by the given Examples) that the additional presence of an amine "of the aniline type" in the composition is advantageous. It is also stated, although there is no evidence, that no free sulfur need be added. In U.S. Pat. No. 2,374,385, a thiazole or other N-containing compound is invariably used as an accelerator; under the acid conditions, thiazole tautomerism can give nitrosatable secondary amines. In U.S. Pat. No. 2,453,689, 'base stock' used for those vulcanisates having the best properties includes a sulphenamide or urea, and alternative N-containing accelerators are suggested. The highest recorded tensile strength is 2700 lb/in$^2$ (18600 kPa). Example VIII of U.S. Pat. No. 1,634,924 discloses curing a mixture comprising 100 parts smoked sheet (natural rubber), 5 parts ZnO, 5 parts sulphur and ½₅ parts diisoamyl xanthogen tetrasulphide, at about 116 C. This is the only instance given in which no amine is used, and the state of cure is very poor by comparison with the products of the other Examples in which dibenzyl amine, ethyl aniline or aniline is present. The amount of sulphur is such that it will almost certainly bloom. In one reported case in U.S. Pat. No. 2,453,689, a rubber stock comprising solely 100 parts Buna S (synthetic rubber), 55 parts carbon black and 5 parts diethyl xanthogen tetrasulphide is vulcanised at about 120 C. It should be noted that neither zinc oxide nor sulphur is present. The results are said to show that 'xanthic sulfides are very active vulcanizing agents even in the absence of auxiliary agents such as accelerators and activators', but the product's tensile strength is relatively low, i.e. 1280 lb/in$^2$ (8825 kPa). In neither of the given specific instances from the prior art is the product likely to be of practical utility. A tensile strength of at least 10,000 and very often at least 20,000 kPa is desirable. Perhaps for this reason, among others, xanthogen polysulphides as described in the given prior art appear not to have been used on any commercial scale, over the last 50 years."

Stevenson then goes on to disclose vulcanizable compositions comprising rubber, a dihydrocarbon xanthogen polysulfide and an xanthate (column 3, lines 10 to 16), wherein the xanthogen polysulfide is a curing agent (column 4, lines 50 to 52). Stevenson also points out in the Example (column 5, lines 65 to 68, column 6, lines 46 to 51, etc.) that the products of his invention are comparable to prior art products except that he has minimized the presence of environmentally undesirable chemicals. Accordingly, Stevenson does not appreciate that XDS can be used to improve the properties of rubber vulcanization.

German Democratic Republic Specification 223720 A1 discloses a process for modifying elastomers or elastomer mixtures, characterized in that diorgano xanthogen disulfides are incorporated in the elastomers or elastomer mixtures at 30° C. to 220° C. followed by further processing and vulcanization at 100 to 250° C. This specification does not disclose reacting the XDS with filler, such as carbon black, simultaneously with or before reaction with elastomer. Our studies have shown that it is essential to react carbon black with XDS either before or simultaneously with rubber. If rubber is reacted with XDS in the absence of rubber, Mooney Scorch Time is undesirably less, Mooney riscosity is undesirably higher, hysteresis at 5 to 14% strain is undersirably higher.

Figure 1:
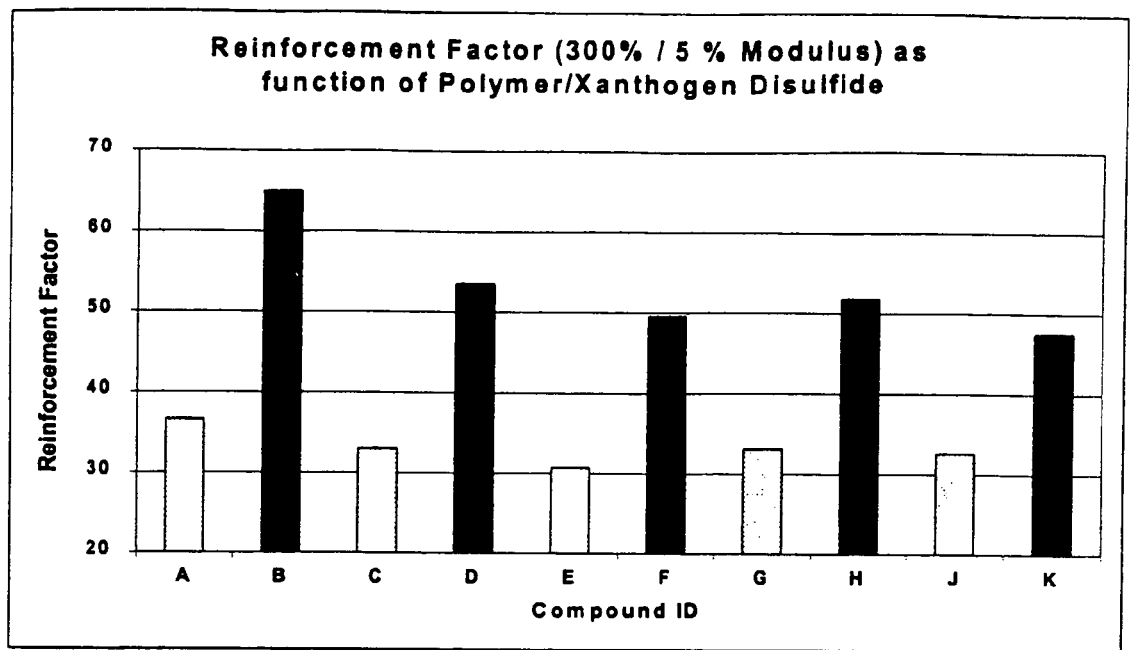
FIG. 1 is the Bound Rubber results of first stage masterbatch from Example 9.

In one aspect, this invention is a process of producing unvulcanized rubber useful for producing vulcanized rubber with improved hysteresis, which comprises mixing a mixing a composition comprising unvulcanized rubber, carbon black and xanthogen polysulfide at an elevated temperature in a non-productive stage.

In a second aspect, this invention is a composition suitable for producing unvulcanized rubber useful for producing vulcanized rubber with improved hysteresis, which comprises unvulcanized rubber, a filler comprising carbon black and xanthogen polysulfide.

In a third aspect, this invention is a process of producing vulcanized rubber with improved hysteresis, which comprises (1) mixing unvulcanized rubber, a filler comprising carbon black and xanthogen polysulfide without other curative ingredients in a non-productive mixing step, then (2) adding the remaining curative ingredients in subsequent mixing steps and vulcanizing the rubber.

In a fourth aspect, this invention is a composition comprising carbon black and xanthogen polysulfide.

In a fifth aspect, this invention is a composition comprising carbon black coated with xanthogen polysulfide.

DETAILS OF THE INVENTION

In order to realize the benefits of XDS as promoters for interaction of carbon black with rubber, the XDS must be added to the rubber in the same mixing stage as the carbon black (the non-productive stage). If the XDS is added in the last stage (the productive stage), as is normal for accelerators, the improved dynamic properties will not be obtained. It is also necessary to attain a temperature of approximately 149° C. during the mixing of the rubber, carbon black and xanthogen disulfide (with a preferred range of 160° C. to 180° C.). To obtain the best results, this temperature should be maintained while mixing for at least three minutes. An improvement in dynamic properties can be realized by simply allowing the batch to reach this temperature, but the greatest benefit results if the batch is mixing at the high temperature for at least three minutes. One form of extended high temperature mixing is to use multiple high temperature re-mills.

The XDS may be added as a separate ingredient to the rubber and carbon black during the first mixing stage. It can also be added to the carbon black in a completely separate prior operation, so that the promotor and the carbon black are added to the rubber as a single ingredient. This avoids the inconvenience of having to measure and add a separate liquid ingredient with the added potential for spills, waste or inaccuracy. The concentration of XDS can range from 0.1 to 100 parts by weight per 100 parts by weight filler (carbon black), preferably, 0.5 to 20 parts by weight per 100 parts by weight carbon black. Typically, XDS is present from 0.1 to 20 phr based on the weight of rubber.

The tendency of the XDS to reduce scorch safety can also be alleviated by the addition of known pre-vulcanization inhibitors (such as N-(cyclohexylthio)phthalamide). These may be added in the last stage of mixing, along with the accelerators, in the fashion normal for these materials. When used to extend the scorch time of compounds containing the XDS, the presence of pre-vulcanization inhibitors does not affect the desired improvement in dynamic properties brought about by the xanthogens.

Figure 3:
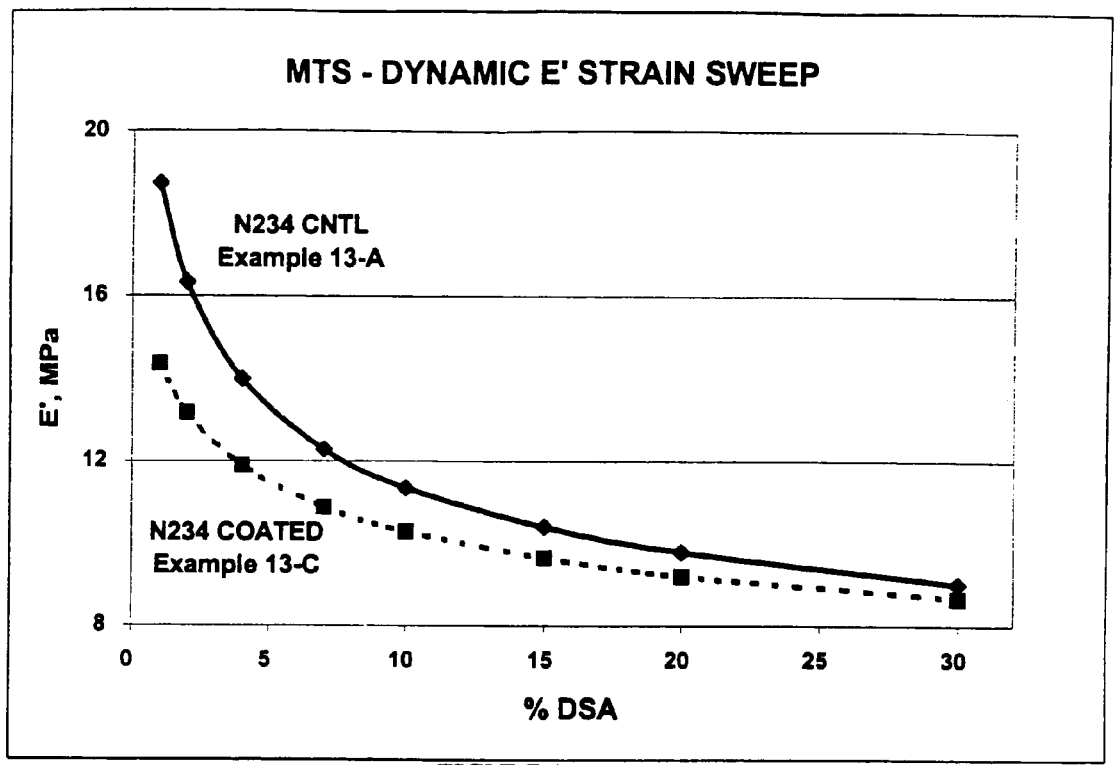
FIG. 3 is Dynamic elastic modulus of cured sample from Example 13 demonstrating higher retained E' as a function of strain indicative of reduced Payne Effect.
Figure 4:
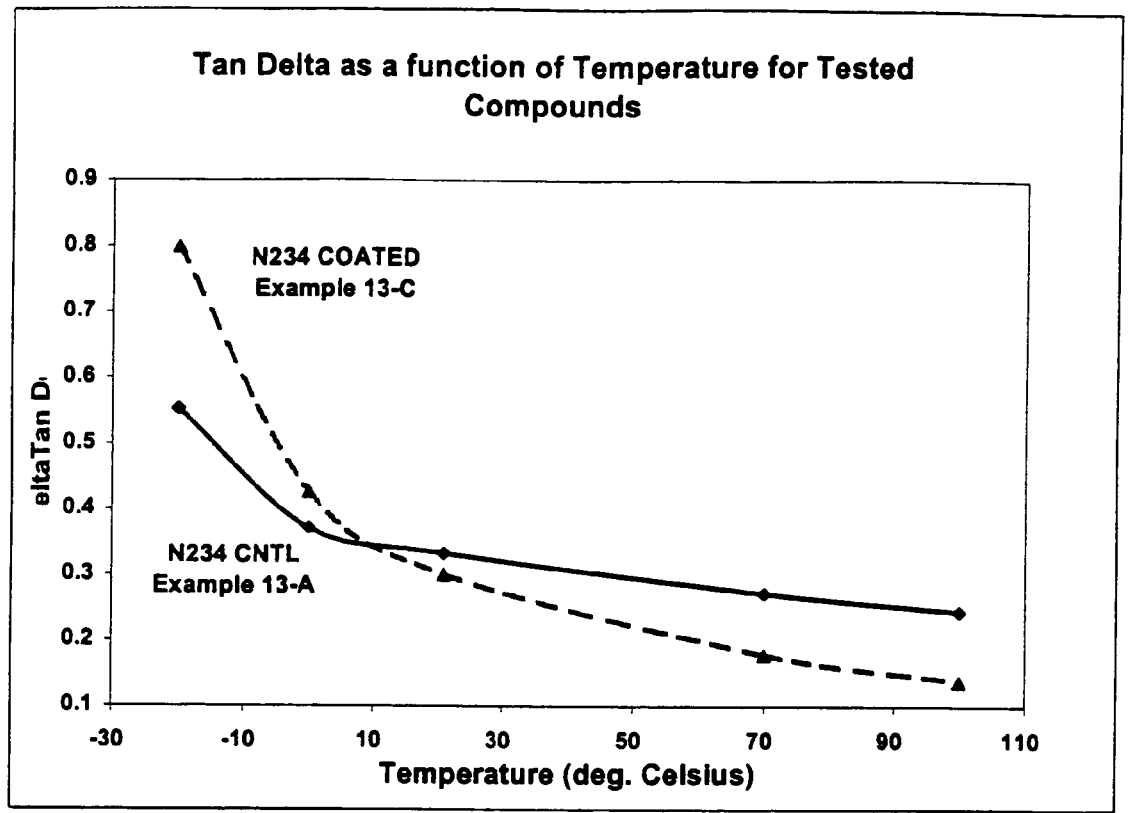
FIG. 4 is Hysteresis properties of cured samples from Example 13 illustrating the optional case of maximum tan delta difference at the temperature extreme.
Figure 5:
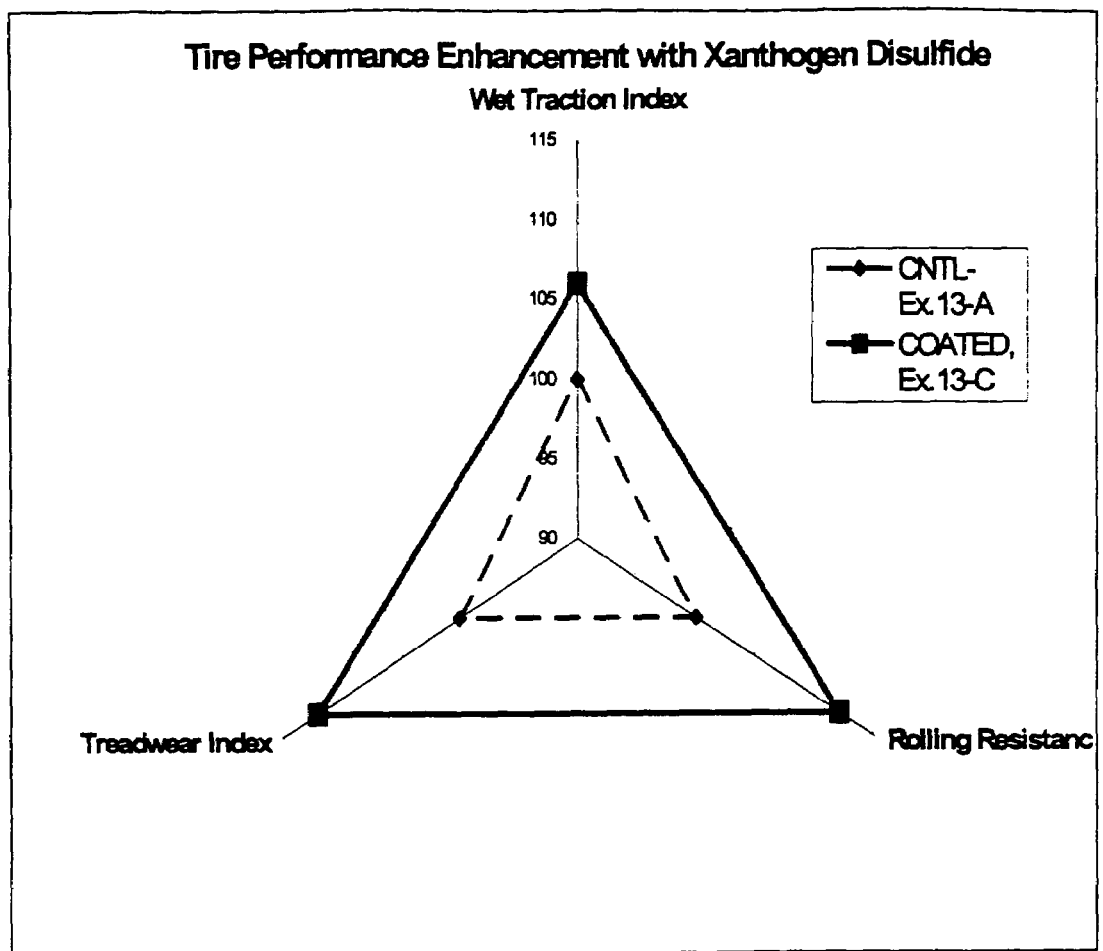
FIG. 5 is Tire performance enhancement across three categories simultaneously effected by the use of XDS.

An improvement in dynamic properties, namely a reduction of hysteresis, or tan δ, in the higher temperature ranges of 60–100° C., was produced in all of the polymers tested. Unexpectedly, the preservation of a high tan at 0° C., and an actual improvement of tan δ to a higher value at −20° C. was observed. This is particularly desirable, since the maintenance of higher tan δ's at lower temperatures is correlated to an improvement in traction under wet and ice conditions, when the rubber is used to make tire treads. Thus, an ideal tire tread rubber will exhibit high tan δ at low temperatures and low tan δ at high temperatures, and it is optimal to maximize the difference in tan at the two temperature extremes. The production of rubber with favorable properties at both high and low temperatures has been difficult to obtain as any changes at one temperature range usually resulted in parallel changes at the other temperature range (see FIG. 3). This difficulty is unexpectedly alleviated by the use of XDS.

SCOPE OF THE INVENTION

The dialkyl xanthogen polysulfides that are useful in this invention have the structure shown below.

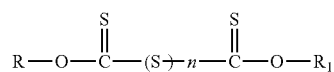

In this structure, R and $R_1$ are alkyl groups. R and $R_1$ may be straight, branched or cyclic chain. In addition, they may contain other heteroatoms, such as oxygen, sulfur or nitrogen. The list given below is typical of the types of groups that may be used, but it is not intended to restrict the choice of R groups that are useful in the practice of this invention. n is an integer from 2 to 8 or higher.

Xanthogen disulfides produced as technical products contain discernable amounts of other materials. These include xanthogen trisulfides, tetrasulfides and polysulfides of higher rank. These materials are normally present in the products referred to as XDS. Their presence does not detract from the performance of the products and in most respects these polysulfides perform as do the xanthogen disulfides in bringing about a favorable interaction or rubber and carbon black.

It should be understood that whenever XDS is referred to in this document, the materials may contain a substantial amount of sulfides of higher rank.

Possible R and $R_1$ Groups

Methyl, ethyl, propyl, butyl, pentyl, hexyl, heptyl, octyl, nonyl, decyl, dodecy, octadecyl, isopropyl, sec-butyl, iso-butyl, tert-butyl, sec-amyl, iso-amyl, tert-amyl, 2-ethylhexyl, tert-octyl, cyclopentyl, cyclohexyl, aryl substituted alkyl, benzyl, phenylethyl ethoxyethyl, phenoxyethyl, etc.

The xanthogens may be used to improve the dynamic properties of many difference kinds of rubber. The rubber may be a single polymer, or a blend of different polymers. Examples of the different polymers that may be used are: emulsion polymerized styrene-butadiene rubber, solution polymerized styrene-butadiene rubber, polybutadiene, natural rubber, polyisobutylene and polyisoprene. The invention has been particularly tested with solution polymerized styrene-butadiene rubber containing medium to high levels of vinyl groups.

The carbon blacks suited for use with the XDS are those normally used in elastomeric compounds. These are carbon blacks with Nitrogen Surface Areas of 10–250 $10^3$ $m^2$/kg, as determined by ASTM D4820. The structure or DBPA Number of the black should measure from 10–250×$10^{-5}$ $m^3$/kg by ASTM D2414. Though not necessary, it is preferable that the promoting agents are pre-coated on the carbon black to maximize the interfacial interaction with the polymer. They can be used neat or can be modified by the addition of a solution of fine suspension of the promoting agent, which is impregnated on the surface at a level of 0.1 to 75 weight percent of the carbon black blend. The modified carbon black may be heat-treated to further the reaction of the promoting agent with the carbon black's surface functionalities.

The carbon black constitutes a filler in the rubber composition and can be mixed with other fillers such as silica, which is now common.

Formulations and Materials

The raw materials used in the following examples are all obtained from commercial sources.

ESBR 1712, emulsion polymerized styrene-butadiene rubber produced by DSM-Copolymer.

ESBR 1500, emulsion polymerized styrene-butadiene rubber produced by DSM-Copolymer.

Cisdene 1203, polybutadiene rubber produced by American Synthetic Rubber Company.

Solflex 1216, solution polymerized styrene-butadiene rubber produced by Goodyear Polymers. The styrene content is 12%, the vinyl content is 46% and the Tg is −45° C.

D706, solution polymerized styrene-butadiene rubber produced by Firestone Synthetic Polymers. The styrene content is 23.5%, the vinyl content is 9% and the Tg=−62° C. D715 solution polymerized styrene-butadiene rubber produced by Firestone Synthetic Polymers. The styrene is 23.5%, the vinyl content is 46% and the glass transition temperature is −39° C.

Budene 1207, polybutadiene rubber produced by Goodyear.

SIR 20, Standard Indonesian Rubber 20 grade.

SMR-L, Standard Malaysian Rubber.

The carbon blacks used were produced by Continental Carbon Company with the following basic analytical properties. The final two experimental carbon blacks were produced by proprietary reactor technology.

| ASTM | TYPE | UNITS | N234 | N339 | EXP. #1 | EXP. #2 |
|------|------|-------|------|------|---------|---------|
| D4820 | NSA | $10^3$ $m^2$/kg | 120 | 91 | 109 | 122 |
| D1510 | IODINE NO. | g/kg | 120 | 90 | 87 | 114 |
| D3765 | CTAB | $10^3$ $m^2$/kg | 119 | 93 | 105 | 128 |
| D2414 | DBP No. | $10^{-5}$ $m^3$/kg | 125 | 120 | 99 | 94 |
| D3493 | CDBP No. | $10^{-5}$ $m^3$/kg | 100 | 101 | 94 | 92 |
| D3265 | TINT | % ITRB | 124 | 110 | 120 | 92 |

Sundex 790, aromatic processing oil produced by Sun Oil.

Sundex 8125, aromatic processing oil produced by Sun Oil.

CPB is a trademark of Uniroyal Chemical Company for dibutyl xanthogen disulfide.

This is the source for all of the dibutyl xanthogen disulfide used in the examples.

The other dialkyl xanthogen disulfides were produced by methods adapted from published procedures, (U.S. Pat. No. 1,491,021, also *Organic Chemistry of Bivalent Sulfur*, Vol. 4, E. Emmet Reid, 1962, Chemical publishing Co., Inc. and references contained therein).

Zinc Oxide, produced by the, Zinc Corporation of America.

Stearic acid, produced by Monson Chemical.

Flexzone 7P is a trademark of the Uniroyal Chemical Company for N-(1,3-dimethylbutyl)-N'-phenyl-p-phenylenediamine.

Sunproof Improved is a trademark of the Uniroyal Chemical Company for microcrystalline wax.

Bowax 615, microcrystalline wax produced by IGI Boler Inc.

Delac NS is a trademark of the Uniroyal Chemical Company for N-tert-butyl-2-benzothiazolylsulfenamide, (TBBS).

DPG, diphenylguanidine produced by Akrochem.

Sulfur 21-10, produced by Georgia Gulf.

The general mixing procedure is given below:

First Pass: The rubber, carbon black, promoter and processing oil are charged to a laboratory internal mixer and mixed for 1.5 minutes. The ram is raised and a sweep performed. The ram is lowered and mixing continued until a designated temperature is reached. The materials are then mixed for a predetermined time at the designated temperature and then discharged.

Second Pass: The masterbatch mixed in the first pass is charged to the mixer. Stearic acid, zinc oxide, antiozonant and wax are added. These ingredients are added in a second pass to avoid possible interference with the promoting process. The materials are mixed for one minute, then the ram is raised and a sweep performed. The ram is lowered and mixing continued until the batch reaches an internal temperature of 138° C., or for a maximum of 5 minutes.

Third pass: The masterbatch produced in the second pass is charged to the mixer. The curatives, sulfur and accelerators, are added. The materials are mixed for one minute, then the ram is raised and a sweep performed. The ram is lowered and mixing continued until the batch reaches an internal temperature of 104° C.

Materials for examples 4–8, were mixed in a Farrel BR1600 internal mixer, with a volume of 1.6 liters. The curing properties were determined on a Model ODR 2000 oscillating disc rheometer. The dynamic properties were determined at 60° C. and 10 Hz over a strain range of 0.2 to 14% using Model RPA 2000 Rubber Process Analyzer. The dynamic properties were also measured at 10 Hz and 1% strain over a temperature range of −20 to 60° C. using the Rheometrics Dynamic Spectrometer.

Materials for examples 9–13 were mixed in a Farrel BR Banbury internal mixer. The curing properties were determined on a Monsanto ODR Model 100 Rheometer. The dynamic properties were determined at 0° C., 21° C., 70° C. and 100° C. at 12 Hz and 4% Double Strain Amplitude with a BFG Flexometer button (25.4 mm×17.8 mm diameter) using a MTS 831 Elastomer Test System. Additional dynamic properties were measured using a Seiko DMS 6100 in the compression mode with test conditions of temperatures from −40° C. to 100° C., at 11.8 Hz with a sample approximately 14–15 mm in length by 4 mm in width and 2 mm in thickness.

Standard ASTM test methods were used for measurement of Mooney viscosity (D3346-90), ODR cure characteristics (D2084-92), MDR cure characteristics (D5889-95), stress-strain (D412-92), tear strength (D624-91) and Shore A hardness (D2240-91). Heat Build-up was determined by ASTM D623-93, Test Method A, using the Goodrich Flexometer. Laboratory abrasion was measured with a Hampden APH-40 abrader according to ASTM D5963-97A.

Zwick Rebound was measured at room temperature according to ISO 4662 (DIN 53512) on 1.91 cm high by 6.38 cm diameter cylindrical specimens. For testing above and below room temperatures, samples were preconditioned for two hours at the specified test temperature.

The following examples demonstrate the use and benefits of xanthogen disulfides in the practice of this invention.

EXAMPLE 1

Preparation of Carbon Black Coated with Dibutyl Xanthogen Disulfide

A 600-gram portion of N-234 grade carbon black was placed in a 3-liter steel beaker. Deionized water, 2800 grams, was added. The mixture was well stirred with a paddle type mechanical stirrer. An emulsion was prepared by mixing water, 300 grams, sodium oleate, 0.30 grams, and dibutyl xanthogen disulfide, 18 grams, in a Waring Blender for about two minutes. The milky emulsion was then added to the stirred carbon black slurry for about a minute. The mixture was stirred for about an hour. The slurry was then filtered. The wet carbon black was then dried in a 60° C. oven to constant weight, for about 46 hours. Yield was 590 grams, 95.5% of theory. This example serves as one method of coating a promoter onto the carbon black surface. The essence of the procedure is to uniformly distribute the agent. There are a multitude of techniques that can accomplish this obvious to those skilled in the art. The coated carbon black as prepared above was used in the following compound recipes along with the further modified products as described in Examples 2–3.

EXAMPLE 2

Carbon Black Coated with Dibutyl Xanthogen Disulfide and Oil

The same procedure was run as in example 1, except that the dibutyl xanthogen disulfide was added as a 75% active solution in paraffinic processing oil.

EXAMPLE 3

Carbon Black Coated with Dibutyl Xanthogen Disulfide at Lower Concentration

The same procedure was run as in example 1, except that 12.0 grams of dibutyl xanthogen disulfide was added.

EXAMPLE 4A

Effect of Xanthogen Disulfide on Compound Properties

In this example the rubber was mixed using the three-stage procedure as described above. In two of the stocks, carbon black was used that had been pre-coated with a xanthogen disulfide. The carbon black level was not adjusted in these two mixes to compensate for the addition of the promoter. In the other stocks where a promoter was employed, the xanthogen disulfide was added as a separate component in the first mixing stage. This example demonstrates that the xanthogen disulfide is effective in reducing the hysteresis of the rubber at the higher test temperature, 60° C., while the hysteresis at the lower temperature range is increased. It further demonstrates that the scorch safety of the rubber may be improved by the addition of a pre-vulcanization inhibitor, without affecting the improvement in hysteresis.

Compound Recipes - Effect of xanthogen disulfide on compound properties

| | Parts per hundred of rubber (phr) | | | | | |
|---|---|---|---|---|---|---|
| | A | B | C | D | E | F |
| First Stage Ingredients | | | | | | |
| Solflex 1216 | 75.0 | 75.0 | 75.0 | 75.0 | 75.0 | 75.0 |
| Budene 1207 | 25.0 | 25.0 | 25.0 | 25.0 | 25.0 | 25.0 |
| Carbon Black, N234 | 72.0 | — | — | 72.0 | 72.0 | 72.0 |
| CB, N234 (Ex. 3, 2% pre-coat) | — | 72.0 | — | — | — | — |
| CB, N234 (Ex. 1, 3% pre-coat) | — | — | 72.0 | — | — | — |
| Sundex 8125 | 32.5 | 32.5 | 32.5 | 32.5 | 32.5 | 32.5 |
| Dibutyl xanthogen disulfide | — | — | — | 3.0 | 3.0 | 3.0 |
| TOTAL (MB-1) | 204.5 | 204.5 | 204.5 | 207.5 | 207.5 | 207.5 |
| First Stage Mix | | | | | | |
| Discharge Temperature, ° C. | 150 | 170 | 170 | 170 | 170 | 170 |

-continued

Compound Recipes - Effect of xanthogen disulfide on compound properties

| | Parts per hundred of rubber (phr) | | | | | |
|---|---|---|---|---|---|---|
| | A | B | C | D | E | F |
| Mix Time at Temperature, Min. | 0 | 5 | 5 | 5 | 5 | 5 |
| Second Stage Ingredients | | | | | | |
| MB-1 | 204.5 | 204.5 | 204.5 | 207.5 | 207.5 | 207.5 |
| Zinc Oxide | 2.5 | 2.5 | 2.5 | 2.5 | 2.5 | 2.5 |
| Stearic Acid | 1.0 | 1.0 | 1.0 | 1.0 | 1.0 | 1.0 |
| Flexzone 7P | 2.0 | 2.0 | 2.0 | 2.0 | 2.0 | 2.0 |
| Bowax 615 | 1.5 | 1.5 | 1.5 | 1.5 | 1.5 | 1.5 |
| TOTAL (MB-2) | 211.5 | 211.5 | 211.5 | 214.5 | 214.5 | 214.5 |
| Third Stage Ingredients | | | | | | |
| MB-2 | 211.5 | 211.5 | 211.5 | 214.5 | 214.5 | 214.5 |
| Delac NS | 1.5 | 1.5 | 1.5 | 1.5 | 1.5 | 1.5 |
| Sulfur 21-10 | 2.0 | 2.0 | 2.0 | 2.0 | 2.0 | 2.0 |
| N-Cyclohexyl-thiophtalimide | — | — | — | — | 0.25 | 0.50 |
| TOTAL | 215.0 | 215.0 | 215.0 | 218.0 | 218.25 | 218.5 |

Compound Properties - Effect of xanthogen disulfide on compound properties

| | A | B | C | D | E | F |
|---|---|---|---|---|---|---|
| Cure Properties - Rheometer 160° C. | | | | | | |
| $M_H-M_L$, dNm | 34 | 31 | 31 | 28 | 30 | 29 |
| $t_s2$, min | 4.8 | 4.9 | 4.9 | 4.5 | 4.8 | 5.3 |
| t'50, min | 7.5 | 7.8 | 8.0 | 7.8 | 8.7 | 9.8 |
| t'90, min | 11.0 | 11.3 | 11.8 | 11.5 | 12.8 | 14.2 |
| Mooney Scorch @ 135° C. | | | | | | |
| $t_3$ | 12 | 16 | 15 | 12 | 13 | 15 |
| Stress/Strain Properties | | | | | | |
| Cure Time, Minutes @ 160° C. | 17 | 17 | 17 | 17 | 20 | 20 |
| Modulus, Mpa | | | | | | |
| 100% Elongation | 2.0 | 2.2 | 2.2 | 2.1 | 2.1 | 2.1 |
| 300% Elongation | 6.3 | 9.6 | 8.9 | 9.5 | 7.7 | 7.1 |
| Tensile, Mpa | 20.3 | 18.6 | 17.7 | 18.2 | 17.2 | 18.3 |
| % Elongation at break | 670 | 470 | 490 | 510 | 460 | 630 |
| Hardness Shore A | 68 | 66 | 65 | 63 | 65 | 64 |
| Dynamic Properties - RPA 2000 Tan δ, 60° C., 10 Hz % Strain | | | | | | |
| 0.7 | 0.136 | 0.134 | 0.132 | 0.116 | 0.126 | 0.133 |
| 1 | 0.174 | 0.158 | 0.151 | 0.142 | 0.149 | 0.149 |
| 2 | 0.242 | 0.198 | 0.188 | 0.176 | 0.181 | 0.183 |
| 5 | 0.273 | 0.224 | 0.214 | 0.202 | 0.206 | 0.209 |
| 7 | 0.269 | 0.223 | 0.215 | 0.203 | 0.206 | 0.209 |
| 14 | 0.247 | 0.211 | 0.203 | 0.196 | 0.197 | 0.198 |
| G', kPa, 60° C., 10 Hz % Strain | | | | | | |
| 0.7 | 6755 | 4353 | 3955 | 3420 | 3450 | 3397 |
| 1 | 5889 | 3965 | 3599 | 3184 | 3184 | 3114 |
| 2 | 4272 | 3170 | 2953 | 2643 | 2640 | 2581 |
| 5 | 2777 | 2290 | 2149 | 2005 | 1991 | 1942 |
| 7 | 2417 | 2057 | 1945 | 1820 | 1820 | 1776 |
| 14 | 1878 | 1661 | 1595 | 1508 | 1507 | 1471 |

-continued

Compound Properties - Effect of xanthogen disulfide on compound properties

|  | A | B | C | D | E | F |
|---|---|---|---|---|---|---|
| % G' Retained | 27.8 | 38.2 | 40.3 | 44.1 | 43.7 | 43.3 |
| Dynamic Properties - Rheometrics Tan δ, 1% strain, 10 Hz Temperature, ° C. | | | | | | |
| −20 | 0.322 | 0.407 | 0.395 | 0.422 | 0.440 | 0.438 |
| 0 | 0.216 | 0.257 | 0.244 | 0.255 | 0.250 | 0.273 |
| 60 | 0.207 | 0.175 | 0.164 | 0.161 | 0.160 | 0.170 |

EXAMPLE 4B

Effect of Process Conditions and Addition Sequence Using XDS

In this example, a series of four rubber compounds were mixed using the three-stage procedure as described above and various modifications of this procedure, of which one of the variations contained XDS in the final (productive) stage.

This example illustrates that the optimal effects of XDS are obtained by using the three-stage mixing procedure as described above with the XDS added in the first (non-productive) stage.

Compound Recipe - Effect of Process Conditions in use of XDS

| | Parts per hundred of rubber (phr) | | | |
|---|---|---|---|---|
| | A | B | C | D |
| Master Batch Ingredients | | | | |
| Solflex 1216 | 75.0 | 75.0 | 75.0 | 75.0 |
| Budene 1207 | 25.0 | 25.0 | 25.0 | 25.0 |
| Carbon Black, N234 | 72.0 | 72.0 | 72.0 | 72.0 |

-continued

Compound Recipe - Effect of Process Conditions in use of XDS

| | Parts per hundred of rubber (phr) | | | |
|---|---|---|---|---|
| | A | B | C | D |
| Sundex 8125 | 32.5 | 32.5 | 32.5 | 32.5 |
| Dibutyl xanthogen disulfide | — | — | — | 3.0 |
| TOTAL (MB-1) | 204.5 | 204.5 | 204.5 | 207.5 |
| Discharge Temperature, ° C. | 150 | 150 | 170 | 170 |
| Mix Time at Temperature, min | 0 | 0 | 5 | 5 |
| Second Stage Ingredients | | | | |
| MB-1 | 204.5 | 204.5 | 204.5 | 207.5 |
| Zinc Oxide | 2.5 | 2.5 | 2.5 | 2.5 |
| Stearic Acid | 1.0 | 1.0 | 1.0 | 1.0 |
| Flexzone 7P | 2.0 | 2.0 | 2.0 | 2.0 |
| Bowax 615 | 1.5 | 1.5 | 1.5 | 1.5 |
| TOTAL | 211.5 | 211.5 | 211.5 | 214.5 |
| Third Stage Ingredients | | | | |
| MB-2 | 211.5 | 211.5 | 211.5 | 214.5 |
| Delac NS | 1.5 | 1.5 | 1.5 | 1.5 |
| Sulfur 21-10 | 2.0 | 2.0 | 2.0 | 2.0 |
| Dibutyl xanthogen disulfide | — | 3.0 | — | — |
| TOTAL | 215.0 | 218.0 | 215.0 | 218.0 |

Compound Properties - Effect of Process Conditions in use of XDS

| | A | B | C | D |
|---|---|---|---|---|
| Cure Properties - Rheometer 160° C. | | | | |
| $M_H$–$M_L$, dNm | 23 | 24 | 23 | 22 |
| $t_s2$, min | 4.13 | 3.29 | 4.65 | 3.99 |
| t'50, min | 5.95 | 5.69 | 6.48 | 6.23 |
| t'90, min | 9.67 | 10.14 | 9.61 | 10.18 |
| Mooney Scorch @ 135° C. | | | | |
| $t_3$, min | 14 | 11 | 20 | 14 |

-continued

Compound Properties - Effect of Process Conditions in use of XDS

|  | A | B | C | D |
|---|---|---|---|---|
| Stress/Strain Properties | | | | |
| Cure Time, Minutes @ 160° C. Modulus, MPa | 15 | 15 | 15 | 15 |
| 100% Elongation | 2.2 | 1.9 | 2.4 | 2.2 |
| 300% Elongation | 7.8 | 8.3 | 9.1 | 9.5 |
| Tensile, MPa | 21.7 | 20.8 | 20.4 | 20.5 |
| % Elongation at break | 600 | 590 | 540 | 470 |
| Hardness Shore A | 68 | 70 | 67 | 68 |
| Dynamic Properties - RPA 2000 | | | | |
| Tan δ, 60° C., 10 Hz % Strain | | | | |
| 0.7 | 0.147 | 0.153 | 0.148 | 0.127 |
| 1 | 0.180 | 0.182 | 0.177 | 0.156 |
| 2 | 0.244 | 0.231 | 0.220 | 0.187 |
| 5 | 0.267 | 0.261 | 0.249 | 0.202 |
| 7 | 0.263 | 0.249 | 0.244 | 0.202 |
| 14 | 0.245 | 0.225 | 0.227 | 0.192 |
| G', kPa, 60° C., 10 Hz % Strain | | | | |
| 0.7 | 6159 | 5547 | 5340 | 3672 |
| 1 | 5522 | 4968 | 4730 | 3357 |
| 2 | 4050 | 3761 | 3713 | 2777 |
| 5 | 2641 | 2472 | 2481 | 2096 |
| 7 | 2320 | 2229 | 2221 | 1898 |
| 14 | 1791 | 1762 | 1745 | 1579 |

EXAMPLE 5

The Effect of Mixing Time

A series of seven rubber compounds were prepared using the three-stage mix described above. The promoter tested was dibutyl xanthogen disulfide, which was added to the rubber and carbon black in the first stage. The mix times in the first mixing stage were varied to demonstrate the need to activate the material. All of the compounds used the same recipe, which is shown below.

This example demonstrates that the rubber, carbon black and xanthogen disulfide must be mixed for a period of time at an elevated temperature in order to realize the full effect of the additive.

Compound Recipe - The effect of mixing time

| | Parts per hundred of rubber (phr) | | | | | | |
|---|---|---|---|---|---|---|---|
| | A | B | C | D | E | F | G |
| First Stage Ingredients | | | | | | | |
| Solflex 1216 | 75.0 | 75.0 | 75.0 | 75.0 | 75.0 | 75.0 | 75.0 |
| Budene 1207 | 25.0 | 25.0 | 25.0 | 25.0 | 25.0 | 25.0 | 25.0 |
| Carbon Black, N234 | 72.0 | 72.0 | 72.0 | 72.0 | 72.0 | 72.0 | 72.0 |
| Sundex 8125 | 32.5 | 32.5 | 32.5 | 32.5 | 32.5 | 32.5 | 32.5 |
| Dibutyl xanthogen disulfide | — | 3.0 | 3.0 | 3.0 | 3.0 | 3.0 | 3.0 |
| TOTAL | 204.5 | 207.5 | 207.5 | 207.5 | 207.5 | 207.5 | 207.5 |

-continued

Compound Recipe - The effect of mixing time

| | Parts per hundred of rubber (phr) | | | | | | |
|---|---|---|---|---|---|---|---|
| | A | B | C | D | E | F | G |
| First Stage Mix | | | | | | | |
| Discharge Temperature, ° C. | 150 | 170 | 170 | 170 | 170 | 170 | 170 |
| Mix Time at Temperature, Min. | 0 | 0 | 1 | 2 | 3 | 4 | 5 |
| Second Stage Ingredients | | | | | | | |
| MB-1 | 204.5 | 207.5 | 207.5 | 207.5 | 207.5 | 207.5 | 207.5 |
| Zinc Oxide | 2.5 | 2.5 | 2.5 | 2.5 | 2.5 | 2.5 | 2.5 |
| Stearic Acid | 1.0 | 1.0 | 1.0 | 1.0 | 1.0 | 1.0 | 1.0 |
| Flexzone 7P | 2.0 | 2.0 | 2.0 | 2.0 | 2.0 | 2.0 | 2.0 |
| Bowax 615 | 1.5 | 1.5 | 1.5 | 1.5 | 1.5 | 1.5 | 1.5 |
| TOTAL | 211.5 | 214.5 | 214.5 | 214.5 | 214.5 | 214.5 | 214.5 |
| Third Stage Ingredients | | | | | | | |
| MB-2 | 211.5 | 214.5 | 214.5 | 214.5 | 214.5 | 214.5 | 214.5 |
| Delac NS | 1.5 | 1.5 | 1.5 | 1.5 | 1.5 | 1.5 | 1.5 |
| Sulfur 21-10 | 2.0 | 2.0 | 2.0 | 2.0 | 2.0 | 2.0 | 2.0 |
| TOTAL | 215.0 | 218.0 | 218.0 | 218.0 | 218.0 | 218.0 | 218.0 |

| Compound Properties - The effect of mixing time | | | | | | | |
|---|---|---|---|---|---|---|---|
| | A | B | C | D | E | F | G |
| Cure Properties-Rheometer 160° C. | | | | | | | |
| $M_H$–$M_L$, dNm | 33 | 31 | 31 | 31 | 30 | 29 | 30 |
| $t_s2$, min | 5.1 | 4.0 | 4.1 | 4.3 | 4.5 | 4.5 | 4.7 |
| t'50, min | 7.6 | 7.2 | 7.4 | 7.5 | 7.9 | 7.8 | 8.0 |
| t'90, min | 11.0 | 11.5 | 11.7 | 11.7 | 12.2 | 12.1 | 12.2 |
| Mooney Scorch @ 135° C. | | | | | | | |
| $t_3$ | 17 | 13 | 12 | 12 | 13 | 13 | 13 |
| Stress/Strain Properties (Cured 15' @ 160° C.) | | | | | | | |
| Modulus, Mpa | | | | | | | |
| 100% Elongation | 2.1 | 2.0 | 2.1 | 2.1 | 2.2 | 2.2 | 2.0 |
| 300% Elongation | 9.4 | 10.1 | 10.7 | 9.8 | 10.7 | 12.0 | 9.8 |
| Tensile, Mpa | 20.1 | 18.2 | 18.1 | 17.2 | 16.5 | 18.8 | 17.2 |
| % Elongation at break | 520 | 430 | 420 | 400 | 400 | 420 | 420 |
| Hardness Shore A | 68 | 64 | 64 | 63 | 64 | 63 | 63 |
| Dynamic Properties - RPA 2000 | | | | | | | |
| Tan δ, 60° C., 10 Hz % Strain | | | | | | | |
| 0.7 | 0.148 | 0.137 | 0.127 | 0.132 | 0.131 | 0.125 | 0.127 |
| 1 | 0.178 | 0.156 | 0.148 | 0.145 | 0.149 | 0.137 | 0.138 |
| 2 | 0.239 | 0.204 | 0.197 | 0.186 | 0.177 | 0.171 | 0.166 |
| 5 | 0.274 | 0.227 | 0.215 | 0.217 | 0.208 | 0.207 | 0.205 |
| 7 | 0.265 | 0.223 | 0.210 | 0.220 | 0.207 | 0.206 | 0.201 |
| 14 | 0.248 | 0.209 | 0.197 | 0.200 | 0.196 | 0.194 | 0.189 |
| G', kPa, 60° C., 10 Hz % Strain | | | | | | | |
| 0.7 | 6159 | 4124 | 3749 | 3649 | 3389 | 3366 | 3190 |
| 1 | 5382 | 3755 | 3394 | 3351 | 3120 | 3141 | 2936 |
| 2 | 4026 | 2972 | 2750 | 2729 | 2549 | 2552 | 2488 |
| 5 | 2646 | 2163 | 1996 | 1965 | 1922 | 1862 | 1805 |
| 7 | 2363 | 1956 | 1844 | 1763 | 1749 | 1708 | 1674 |
| 14 | 1831 | 1580 | 1499 | 1456 | 1446 | 1421 | 1414 |
| % G' Retained | 29.7 | 38.3 | 40.0 | 40.0 | 42.7 | 42.2 | 44.3 |
| Dynamic Properties - Rheometrics | | | | | | | |
| Tan δ, 1% strain, 10 Hz Temperature, ° C. | | | | | | | |
| −20 | 0.365 | 0.369 | 0.442 | 0.427 | 0.446 | 0.429 | 0.458 |
| 0 | 0.248 | 0.234 | 0.247 | 0.251 | 0.250 | 0.242 | 0.243 |
| 60 | 0.199 | 0.168 | 0.139 | 0.150 | 0.137 | 0.134 | 0.130 |

EXAMPLE 6

Non-effect of Oil Diluent

A series of three rubber compounds were prepared using the three-stage mix described above. The promoter tested was dibutyl xanthogen disulfide, which was added as a pre-coat on the carbon black, as the neat material, and as a solution in processing oil. The level of carbon black was not adjusted in this example to account for the additive. This example demonstrates that the presence of an oil diluent does not affect the performance of the xanthogen disulfide additive.

| Compound Recipe - Non-effect of oil diluent | | | |
|---|---|---|---|
| | Parts per hundred of rubber (phr) | | |
| | A | B | C |
| First Stage Ingredients | | | |
| Solflex 1216 | 75.0 | 75.0 | 75.0 |
| Budene 1207 | 25.0 | 25.0 | 25.0 |
| Carbon Black, N234 | 72.0 | — | — |
| CB, N234 (Ex. 2, 3% pre-coat + 1% oil) | — | 72.0 | — |
| CB, N234 (Ex. 1, 3% pre-coat) | — | — | 72.0 |
| Sundex 8125 | 32.5 | 32.5 | 32.5 |
| TOTAL | 204.5 | 204.5 | 204.5 |
| First Stage Mix | | | |
| Discharge Temperature, ° C. | 150 | 170 | 170 |
| Mix Time at Temperature, Min. | 0 | 5 | 5 |

-continued

Compound Recipe - Non-effect of oil diluent

Parts per hundred of rubber (phr)

| | A | B | C |
|---|---|---|---|
| Second Stage Ingredients | | | |
| MB-1 | 204.5 | 204.5 | 204.5 |
| Zinc Oxide | 2.5 | 2.5 | 2.5 |
| Stearic Acid | 1.0 | 1.0 | 1.0 |
| Flexzone 7P | 2.0 | 2.0 | 2.0 |
| Bowax 615 | 1.5 | 1.5 | 1.5 |
| TOTAL | 211.5 | 211.5 | 211.5 |
| Third Stage Ingredients | | | |
| MB-2 | 211.5 | 211.5 | 211.5 |
| Delac NS | 1.5 | 1.5 | 1.5 |
| Sulfur 21-10 | 2.0 | 2.0 | 2.0 |
| TOTAL | 215.0 | 215.0 | 215.0 |

Compound Properties - Non-effect of oil diluent

| | A | B | C |
|---|---|---|---|
| Cure Properties - Rheometer 160° C. | | | |
| $M_H-M_L$, dNm | 34 | 31 | 30 |
| $t_s2$, min | 4.9 | 4.8 | 4.8 |
| t'50, min | 7.5 | 7.6 | 7.7 |
| t'90, min | 11.1 | 11.8 | 11.9 |
| Mooney Scorch @ 135° C. | | | |
| $t_3$, min | 14 | 16 | 15 |
| Stress/Strain Properties | | | |
| (Cured 17' @ 160° C.) | | | |
| Modulus, Mpa | | | |
| 100% Elongation | 1.9 | 1.7 | 2.1 |
| 300% Elongation | 8.1 | 7.7 | 8.6 |
| Tensile, Mpa | 19.2 | 19.7 | 18.3 |
| % Elongation at break | 540 | 540 | 460 |
| Hardness Shore A | 66 | 67 | 65 |
| Dynamic Properties - RPA 2000 | | | |
| Tan δ, 60° C., 10 Hz | | | |
| % Strain | | | |
| 0.7 | 0.157 | 0.132 | 0.132 |
| 1 | 0.175 | 0.150 | 0.159 |
| 2 | 0.234 | 0.191 | 0.200 |
| 5 | 0.271 | 0.219 | 0.221 |
| 7 | 0.266 | 0.225 | 0.220 |
| 14 | 0.245 | 0.207 | 0.210 |
| G', kPa, 60° C., 10 Hz | | | |
| % Strain | | | |
| 0.7 | 7031 | 3756 | 3718 |
| 1 | 6147 | 3524 | 3464 |
| 2 | 4483 | 2849 | 2753 |
| 5 | 2808 | 2042 | 2012 |
| 7 | 2508 | 1835 | 1833 |
| 14 | 1929 | 1514 | 1473 |
| % G' Retained | 27.4 | 40.3 | 39.6 |

Compound Properties - Non-effect of oil diluent

| | A | B | C |
|---|---|---|---|
| Dynamic Properties - Rheometrics | | | |
| Tan δ, 1% strain, 10 Hz | | | |
| T,° C. | | | |
| −20 | 0.361 | 0.385 | 0.412 |
| 0 | 0.248 | 0.242 | 0.256 |
| 60 | 0.202 | 0.169 | 0.172 |

EXAMPLE 7

Effect with Emulsion Styrene-Butadiene Rubber

In this example, an emulsion polymerized styrene-butadiene rubber (ESBR) is used. Pre-coated carbon black was prepared as in Example 1. The three stage mixing procedure was used as described earlier. In this example the carbon black level in compound C was adjusted to compensate for the promoting additive.

Compound Recipe - Effect with Emulsion Styrene-Butadiene Rubber

Parts per hundred of rubber (phr)

| | A | B | C |
|---|---|---|---|
| First Stage Ingredients | | | |
| ESBR 1712 | 82.4 | 82.4 | 82.4 |
| ESBR 1500 | 20.0 | 20.0 | 20.0 |
| BR 1203 | 20.0 | 20.0 | 20.0 |
| Carbon Black, N234 | 85.0 | 85.0 | — |
| CB, N234 (Ex. 1, 3% pre-coat) | — | — | 87.6 |
| Sundex 790 | 27.6 | 27.6 | 27.6 |
| Dibutyl xanthogen disulfide | — | 2.6 | — |
| TOTAL | 235.0 | 237.6 | 237.6 |
| First Stage Mix | | | |
| Discharge Temperature, ° C. | 150 | 170 | 170 |
| Mix Time at Temperature, Min. | 0 | 5 | 5 |
| Second Stage Ingredients | | | |
| MB-1 | 235.0 | 237.6 | 237.6 |
| Zinc Oxide | 3.0 | 3.0 | 3.0 |
| Stearic Acid | 1.5 | 1.5 | 1.5 |
| Flexzone 7P | 1.0 | 1.0 | 1.0 |
| Sunproof Improved | 0.5 | 0.5 | 0.5 |
| TOTAL | 241.0 | 243.6 | 243.6 |
| Third Stage Ingredients | | | |
| MB-2 | 241.0 | 243.6 | 243.6 |
| Delac NS | 1.0 | 1.0 | 1.0 |
| Diphenylguanidine | 0.4 | 0.4 | 0.4 |
| Sulfur 21-10 | 1.75 | 1.75 | 1.75 |
| TOTAL | 244.15 | 246.75 | 246.75 |

| Compound Properties - Effect with Emulsion Styrene-Butadiene Rubber | | | |
|---|---|---|---|
| | A | B | C |
| Cure Properties-Rheometer 160° C. | | | |
| $M_H$–$M_L$, dNm | 23 | 23 | 23 |
| $t_s2$, min | 5.5 | 3.3 | 3.4 |
| t'50, min | 7.7 | 5.7 | 5.9 |
| t'90, min | 11.8 | 10.8 | 10.9 |
| Mooney Scorch @ 135° C. | | | |
| $t_3$, min | 20 | 9 | 10 |
| Stress/Strain Properties | | | |
| (Cured 15' @ 160° C.) | | | |
| Modlus, MPa | | | |
| 100% Elongation | 1.5 | 1.7 | 1.8 |
| 300% Elongation | 5.2 | 7.7 | 8.3 |
| Tensile, MPa | 18.8 | 19.7 | 19.2 |
| % Elongation at break | 690 | 580 | 560 |
| Hardness Shore A | 67 | 64 | 65 |
| Dynamic Properties - RPA 2000 | | | |
| Tan δ, 60° C., 10 Hz | | | |
| % Strain | | | |
| 0.7 | 0.213 | 0.192 | 0.197 |
| 1 | 0.244 | 0.215 | 0.225 |
| 2 | 0.329 | 0.272 | 0.298 |
| 5 | 0.373 | 0.310 | 0.334 |
| 7 | 0.380 | 0.307 | 0.327 |
| 14 | 0.355 | 0.289 | 0.306 |
| G', Kpa, 60° C., 10 Hz | | | |
| % Strain | | | |
| 0.7 | 6296 | 4544 | 5279 |
| 1 | 5382 | 4057 | 4709 |
| 2 | 3646 | 2980 | 3258 |
| 5 | 2143 | 1904 | 2045 |
| 7 | 1800 | 1678 | 1791 |
| 14 | 1328 | 1310 | 1373 |
| % G' Retained | 21.9 | 28.8 | 26.0 |
| Dynamic Properties - Rheometrics | | | |
| Tan δ, 1% strain, 10 Hz | | | |
| Temperature, ° C. | | | |
| −20 | 0.340 | 0.368 | 0.352 |
| 0 | 0.315 | 0.290 | 0.308 |
| 60 | 0.296 | 0.238 | 0.278 |

EXAMPLE 8

Effect of Various Xanthogen Disulfides

This example demonstrates the use of a various substituted xanthogen disulfides in improving the properties of an SSBR/BR rubber compound. The different promoting agents were added at equimolar levels.

| Compound Recipe - Effect of various xanthogen disulfides | | | | | | | | |
|---|---|---|---|---|---|---|---|---|
| | Parts per hundred of rubber (phr) | | | | | | | |
| | A | B | C | D | E | F | G | H |
| First Stage Ingredients | | | | | | | | |
| Solflex 1216 | 75.0 | 75.0 | 75.0 | 75.0 | 75.0 | 75.0 | 75.0 | 75.0 |
| Budene 1207 | 25.0 | 25.0 | 25.0 | 25.0 | 25.0 | 25.0 | 25.0 | 25.0 |
| Carbon Black, N234 | 72.0 | 72.0 | 72.0 | 72.0 | 72.0 | 72.0 | 72.0 | 72.0 |
| Sundex 8125 | 32.0 | 32.0 | 32.0 | 32.0 | 32.0 | 32.0 | 32.0 | 32.0 |
| Dibutyl xanthogen disulfide | — | 3.00 | — | — | — | — | — | — |
| Dihexyl xanthogen disulfide | — | — | 3.57 | — | — | — | — | — |
| Di-2-butyl xanthogen disulfide | — | — | — | 3.00 | — | — | — | — |
| Dicyclohexyl xanthogen disulfide | — | — | — | — | 3.51 | — | — | — |
| Dipentyl xanthogen disulfide | — | — | — | — | — | 3.27 | — | — |
| Di-2-ethylhexyl xanthogen disulfide | — | — | — | — | — | — | 4.14 | — |
| Dibenzyl xanthogen disulfide | — | — | — | — | — | — | — | 3.12 |
| TOTAL | 204.0 | 207.0 | 207.57 | 207.0 | 207.51 | 207.27 | 208.14 | 207.12 |
| First Stage Mix | | | | | | | | |
| Discharge Temperature, ° C. | 170 | 170 | 170 | 170 | 170 | 170 | 170 | 170 |
| Mix Time at Temperature, Min. | 0 | 3 | 3 | 3 | 3 | 3 | 3 | 3 |

-continued

Compound Recipe - Effect of various xanthogen disulfides

Parts per hundred of rubber (phr)

| | A | B | C | D | E | F | G | H |
|---|---|---|---|---|---|---|---|---|
| *Second Stage Ingredients* | | | | | | | | |
| MB-1 | 204.0 | 207.0 | 207.57 | 207.00 | 207.51 | 207.27 | 208.14 | 207.12 |
| Zinc Oxide | 2.5 | 2.5 | 2.5 | 2.5 | 2.5 | 2.5 | 2.5 | 2.5 |
| Stearic Acid | 1.0 | 1.0 | 1.0 | 1.0 | 1.0 | 1.0 | 1.0 | 1.0 |
| Flexzone 7P | 2.0 | 2.0 | 2.0 | 2.0 | 2.0 | 2.0 | 2.0 | 2.0 |
| Bowax 615 | 1.5 | 1.5 | 1.5 | 1.5 | 1.5 | 1.5 | 1.5 | 1.5 |
| TOTAL | 211.0 | 214.0 | 214.57 | 214.0 | 214.51 | 214.27 | 215.14 | 214.12 |
| *Third Stage Ingredients* | | | | | | | | |
| MB-2 | 211.00 | 214.00 | 214.57 | 214.00 | 214.51 | 214.27 | 215.14 | 214.12 |
| Delac NS | 1.5 | 1.5 | 1.5 | 1.5 | 1.5 | 1.5 | 1.5 | 1.5 |
| Sulfur 21-10 | 2.0 | 2.0 | 2.0 | 2.0 | 2.0 | 2.0 | 2.0 | 2.0 |
| TOTAL | 214.5 | 217.5 | 218.07 | 217.5 | 218.01 | 217.77 | 218.64 | 217.62 |

Compound Properties - Effect of various xanthogen disulfides

| | A | B | C | D | E | F | G | H |
|---|---|---|---|---|---|---|---|---|
| *Cure Properties - Rheometer 160° C.* | | | | | | | | |
| $M_H$–$M_L$, dNm | 33 | 31 | 30 | 30 | 30 | 31 | 31 | 28 |
| $t_s2$, min | 5.9 | 4.3 | 5.0 | 4.2 | 4.7 | 5.3 | 5.4 | 4.5 |
| t'50, min | 8.9 | 8.2 | 8.8 | 7.0 | 7.5 | 8.7 | 8.8 | 7.3 |
| t'90, min | 12.3 | 12.3 | 13.2 | 10.2 | 10.5 | 12.5 | 12.2 | 10.4 |
| Mooney Scorch @ 135° C. | | | | | | | | |
| $t_3$ | 22 | 13 | 17 | 14 | 17 | 18 | 19 | 15 |
| *Stress/Strain Properties* | | | | | | | | |
| Cure Time, Minutes @ 160° C. | 20 | 20 | 20 | 15 | 15 | 20 | 20 | 15 |
| Modulus, Mpa | | | | | | | | |
| 100% Elongation | 2.2 | 2.3 | 2.1 | 2.4 | 2.1 | 2.1 | 2.3 | 1.8 |
| 300% Elongation | 10.8 | 13.2 | 11.1 | 13.9 | 11.9 | 11.3 | 11.7 | 9.9 |
| Tensile, Mpa | 19.9 | 19.3 | 18.7 | 18.7 | 18.5 | 19.9 | 18.8 | 19.3 |
| % Elongation at break | 470 | 410 | 470 | 360 | 410 | 470 | 420 | 490 |
| Hardness Shore A | 66 | 63 | 63 | 65 | 65 | 66 | 65 | 64 |
| *Dynamic Properties - RPA 2000* | | | | | | | | |
| Tan δ, 60° C., 10 Hz | | | | | | | | |
| % Strain | | | | | | | | |
| 0.7 | 0.146 | 0.128 | 0.137 | 0.136 | 0.116 | 0.124 | 0.111 | 0.143 |
| 1 | 0.187 | 0.144 | 0.169 | 0.152 | 0.143 | 0.148 | 0.130 | 0.168 |
| 2 | 0.246 | 0.188 | 0.215 | 0.185 | 0.190 | 0.188 | 0.167 | 0.219 |
| 5 | 0.274 | 0.220 | 0.241 | 0.210 | 0.220 | 0.221 | 0.194 | 0.247 |
| 7 | 0.274 | 0.214 | 0.236 | 0.209 | 0.219 | 0.219 | 0.191 | 0.253 |
| 14 | 0.254 | 0.197 | 0.220 | 0.197 | 0.208 | 0.209 | 0.179 | 0.242 |
| G', kPa, 60° C., 10 Hz | | | | | | | | |
| % Strain | | | | | | | | |
| 0.7 | 6641 | 4001 | 4368 | 3596 | 4208 | 3688 | 3382 | 4338 |
| 1 | 5846 | 3712 | 3960 | 3287 | 3852 | 3357 | 3066 | 3944 |
| 2 | 4251 | 2964 | 3025 | 2699 | 3015 | 2734 | 2544 | 3055 |
| 5 | 2699 | 2132 | 2124 | 2029 | 2225 | 1997 | 1919 | 2148 |
| 7 | 2347 | 1926 | 1900 | 1855 | 1995 | 1823 | 1751 | 1890 |
| 14 | 1789 | 1616 | 1554 | 1543 | 1615 | 1484 | 1483 | 1487 |
| % G' Retained | 26.9 | 40.3 | 35.6 | 42.9 | 38.4 | 40.2 | 43.8 | 34.3 |

-continued

| Compound Properties - Effect of various xanthogen disulfides | | | | | | | | |
|---|---|---|---|---|---|---|---|---|
| | A | B | C | D | E | F | G | H |
| Dynamic Properties - Rheometrics | | | | | | | | |
| Tan δ, 1% strain, 10 Hz Temperature, °C. | | | | | | | | |
| −20 | 0.355 | 0.448 | 0.403 | 0.421 | 0.440 | 0.428 | 0.409 | 0.436 |
| 0 | 0.261 | 0.270 | 0.271 | 0.258 | 0.266 | 0.284 | 0.269 | 0.269 |
| 60 | 0.229 | 0.171 | 0.203 | 0.162 | 0.170 | 0.200 | 0.198 | 0.182 |

EXAMPLE 9

Effect of Dibutyl Xanthogen Disulfide on Blends of Solution SBR/BR/NR and N234 Carbon Black This example demonstrates the advantage of using a xanthogen disulfide (CPB) to enhance the properties of blends of SSBR/BR and NR with N234 carbon black as the filler. Here the control mix of each pair is a standard factory type 2-stage mix.

| Compound Recipe - Effect of xanthogen disulfide on blends of SSBR/BR/NR/N234. | | | | | | | | | | |
|---|---|---|---|---|---|---|---|---|---|---|
| Parts per hundred of rubber (phr) | | | | | | | | | | |
| | A | B | C | D | E | F | G | H | J | K |
| First Stage Ingredients | | | | | | | | | | |
| Solflex 1216 | 75.0 | 75.0 | 45.0 | 45.0 | — | — | — | — | — | — |
| Budene 1207 | 25.0 | 25.0 | 25.0 | 25.0 | 25.0 | 25.0 | 25.0 | 25.0 | 25.0 | 25.0 |
| SMR -L | — | — | 30.0 | 30.0 | — | — | 30.0 | 30.0 | — | — |
| Duradene 715 | — | — | — | — | 75.0 | 75.0 | 45.0 | 45.0 | — | — |
| Duradene 706 | — | — | — | — | — | — | — | — | 75.0 | 75.0 |
| Carbon Black, N234 | 72.0 | 72.0 | 72.0 | 72.0 | 72.0 | 72.0 | 72.0 | 72.0 | 72.0 | 72.0 |
| Sundex 8125 | 32.5 | 32.5 | 32.5 | 32.5 | 32.5 | 32.5 | 32.5 | 32.5 | 32.5 | 32.5 |
| Zinc Oxide | 2.5 | — | 2.5 | — | 2.5 | — | 2.5 | — | 2.5 | — |
| Stearic Acid | 1.0 | — | 1.0 | — | 1.0 | — | 1.0 | — | 1.0 | — |
| Flexzone 7P | 2.0 | — | 2.0 | — | 2.0 | — | 2.0 | — | 2.0 | — |
| Bowax 615 | 1.5 | — | 1.5 | — | 1.5 | — | 1.5 | — | 1.5 | — |
| Dibutyl xanthogen disulfide | — | 3.0 | — | 3.0 | — | 3.0 | — | 3.0 | — | 3.0 |
| TOTAL | 211.5 | 207.5 | 211.5 | 207.5 | 211.5 | 207.5 | 211.5 | 207.5 | 211.5 | 207.5 |
| First Stage Mix | | | | | | | | | | |
| Discharge Temp., °C. | 150 | 170 | 150 | 170 | 150 | 170 | 150 | 170 | 150 | 170 |
| Mix Time at Temp., Min. | 0 | 3 | 0 | 3 | 0 | 3 | 0 | 3 | 0 | 3 |
| Second Stage Ingredients | | | | | | | | | | |
| MB-1 | | 207.5 | | 207.5 | | 207.5 | | 207.5 | | 207.5 |
| Zinc Oxide | | 2.5 | | 2.5 | | 2.5 | | 2.5 | | 2.5 |
| Stearic Acid | | 1.0 | | 1.0 | | 1.0 | | 1.0 | | 1.0 |
| Flexzone 7P | | 2.0 | | 2.0 | | 2.0 | | 2.0 | | 2.0 |
| Bowax 615 | | 1.5 | | 1.5 | | 1.5 | | 1.5 | | 1.5 |
| TOTAL | | 214.5 | | 214.5 | | 214.5 | | 214.5 | | 214.5 |
| Third Stage Ingredients | | | | | | | | | | |
| MB-2 | 211.5 | 214.5 | 211.5 | 214.5 | 211.5 | 214.5 | 211.5 | 214.5 | 211.5 | 214.5 |
| Delac NS | 1.5 | 1.5 | 1.5 | 1.5 | 1.5 | 1.5 | 1.5 | 1.5 | 1.5 | 1.5 |
| Sulfur 21-10 | 2.0 | 2.0 | 2.0 | 2.0 | 2.0 | 2.0 | 2.0 | 2.0 | 2.0 | 2.0 |
| TOTAL | 215.0 | 218.0 | 215.0 | 218.0 | 215.0 | 218.0 | 215.0 | 218.0 | 215.0 | 218.0 |

Compound Properties - Effect of xanthogen disulfide on blends of SSBR/BR/NR/N234

|  | A | B | C | D | E | F | G | H | J | K |
|---|---|---|---|---|---|---|---|---|---|---|
| Bound Rubber, %, 1st Stage | 42.8 | 75.9 | 52.3 | 70.6 | 42.2 | 69.1 | 52.4 | 71.6 | 38.6 | 58.4 |
| Cure Properties - Rheometer 160° C. | | | | | | | | | | |
| $M_H$–$M_L$, dNm | 32.1 | 29.4 | 30.0 | 28.0 | 27.2 | 26.7 | 29.1 | 28.5 | 29.0 | 26.4 |
| $T_s2$, min | 5.5 | 4.8 | 3.8 | 4.3 | 5.3 | 5.3 | 3.8 | 4.3 | 5.3 | 5.0 |
| T'50, min | 8.5 | 7.8 | 5.3 | 6.0 | 7.0 | 7.3 | 5.0 | 5.8 | 6.8 | 6.5 |
| T'90, min | 11.5 | 10.5 | 6.8 | 7.3 | 8.8 | 8.8 | 6.0 | 6.8 | 8.0 | 7.5 |
| Stress/Strain Properties - Cured 15' @ 160° C. | | | | | | | | | | |
| Modulus, Mpa | | | | | | | | | | |
| 5% Elongation | 0.35 | 0.28 | 0.29 | 0.25 | 0.33 | 0.30 | 0.30 | 0.25 | 0.30 | 0.27 |
| 100% Elongation | 2.62 | 2.96 | 2.07 | 2.48 | 2.20 | 2.76 | 2.07 | 2.48 | 2.07 | 2.34 |
| 300% Elongation | 12.82 | 18.19 | 9.58 | 13.37 | 10.13 | 14.88 | 9.92 | 12.95 | 9.78 | 12.82 |
| $M_{300}$/$M_5$ | 36.6 | 65.0 | 33.0 | 53.5 | 30.7 | 49.6 | 33.1 | 51.8 | 32.6 | 47.5 |
| Tensile, Mpa | 18.81 | 20.19 | 19.71 | 18.40 | 19.77 | 19.09 | 20.67 | 19.84 | 18.88 | 20.60 |
| % Elongation at break | 420 | 320 | 530 | 380 | 520 | 360 | 550 | 420 | 500 | 430 |
| Hardness Shore A | 65 | 63 | 66 | 62 | 66 | 62 | 66 | 62 | 65 | 61 |
| Dynamic Properties - Seiko | | | | | | | | | | |
| Tan δ, 11.7 Hz Temperature, ° C. | | | | | | | | | | |
| −20 | 0.553 | 0.805 | 0.545 | 0.674 | 0.672 | 0.802 | 0.636 | 0.680 | 0.461 | 0.548 |
| 0 | 0.371 | 0.439 | 0.436 | 0.440 | 0.475 | 0.482 | 0.481 | 0.461 | 0.416 | 0.447 |
| 20 | 0.333 | 0.323 | 0.395 | 0.346 | 0.419 | 0.375 | 0.426 | 0.379 | 0.388 | 0.373 |
| 70 | 0.273 | 0.206 | 0.302 | 0.243 | 0.341 | 0.253 | 0.347 | 0.262 | 0.331 | 0.268 |
| 100 | 0.244 | 0.163 | 0.263 | 0.196 | 0.299 | 0.213 | 0.312 | 0.224 | 0.299 | 0.228 |

Figure 2:
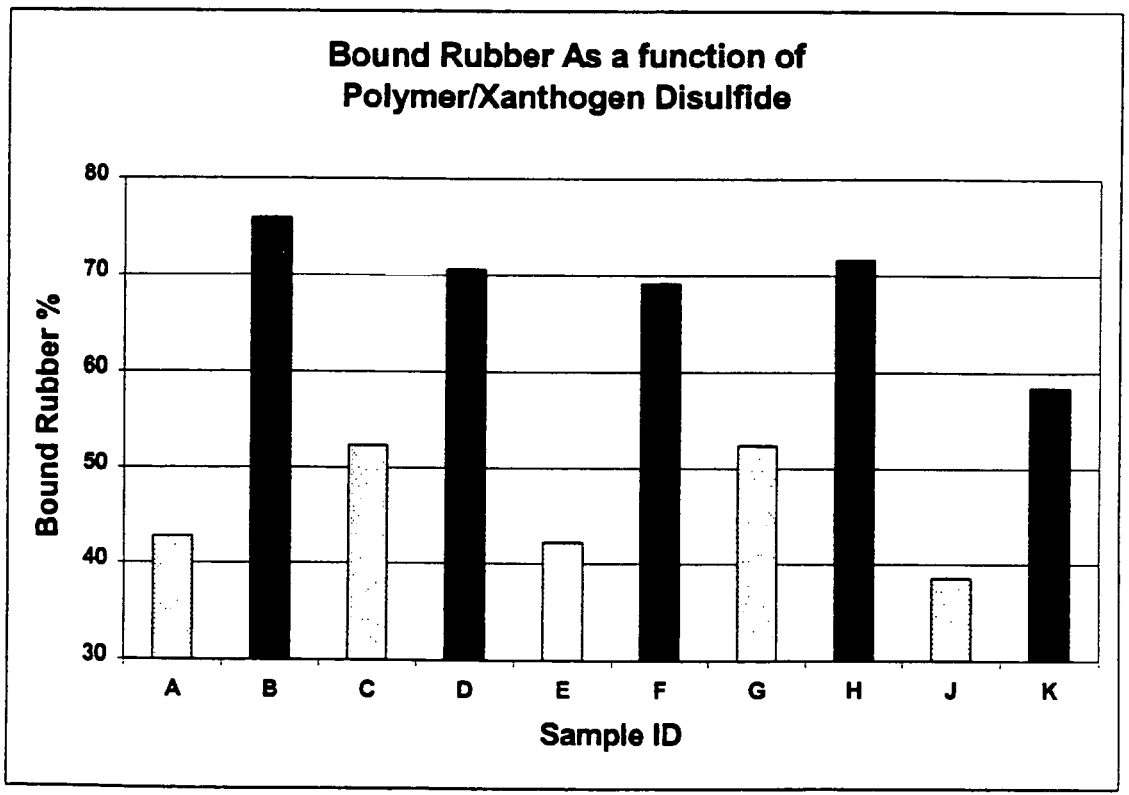
FIG. 2 is reinforcement Factor of cured samples from Example 9.

FIGS. 1 and 2 present evidence of increased filler-polymer interaction as noted by an increase in reinforcement factor (300% Modulus/5% Modulus) as well as a substantial increase in bound rubber each xanthogen addition.

EXAMPLE 10

Effect of Dibutyl Xanthogen Disulfide on Blends of Solution SBR/BR/NR and N339 Carbon Black and Reduced Carbon Black Loading This example demonstrates that xanthogen disulfide can be used to enhance the properties of blends of SSBR/BR and NR, and that it is also effective with a carbon black of lower surface area (than N234) and at a lower loading (than 72 phr).

Compound Recipe - Effect of xanthogen disulfide on blends of SSBR/BR/NR/N339

Parts per hundred of rubber (phr)

|  | A | B | C | D | E | F |
|---|---|---|---|---|---|---|
| First Stage Ingredients | | | | | | |
| Solflex 1216 | 75.0 | 75.0 | — | — | — | — |
| Budene 1207 | 25.0 | 25.0 | 25.0 | 25.0 | 25.0 | 25.0 |
| SMR -L | — | — | 30.0 | 30.0 | 30.0 | 30.0 |
| Duradene 715 | — | — | 45.0 | 45.0 | 45.0 | 45.0 |
| Carbon Black, N339 | 72.0 | 72.0 | 72.0 | 72.0 | 50.0 | 50.0 |
| Sundex 8125 | 32.5 | 32.5 | 32.5 | 32.5 | 32.5 | 32.5 |
| Zinc Oxide | 2.5 | — | 2.5 | — | 2.5 | — |
| Stearic Acid | 1.0 | — | 1.0 | — | 1.0 | — |
| Flexzone 7P | 2.0 | — | 2.0 | — | 2.0 | — |
| Bowax 615 | 1.5 | — | 1.5 | — | 1.5 | — |
| Dibutyl xanthogen disulfide | — | 3.0 | — | 3.0 | — | 3.0 |

-continued

Compound Recipe - Effect of xanthogen disulfide on blends of SSBR/BR/NR/N339

Parts per hundred of rubber (phr)

|  | A | B | C | D | E | F |
|---|---|---|---|---|---|---|
| TOTAL | 211.5 | 207.5 | 211.5 | 207.5 | 211.5 | 207.5 |
| First Stage Mix | | | | | | |
| Discharge Temperature, ° C. | 150 | 170 | 150 | 170 | 150 | 170 |
| Mix Time at Temperature, Min. | 0 | 3 | 0 | 3 | 0 | 3 |
| Second Stage Ingredients | | | | | | |
| MB-1 | | 207.5 | | 207.5 | | 207.5 |
| Zinc Oxide | | 2.5 | | 2.5 | | 2.5 |
| Stearic Acid | | 1.0 | | 1.0 | | 1.0 |
| Flexzone 7P | | 2.0 | | 2.0 | | 2.0 |
| Bowax 615 | | 1.5 | | 1.5 | | 1.5 |
| TOTAL | | 214.5 | | 214.5 | | 214.5 |
| Third Stage Ingredients | | | | | | |
| MB-2 | 211.5 | 214.5 | 211.5 | 214.5 | 211.5 | 214.5 |
| Delac NS | 1.5 | 1.5 | 1.5 | 1.5 | 1.5 | 1.5 |
| Sulfur 21-10 | 2.0 | 2.0 | 2.0 | 2.0 | 2.0 | 2.0 |
| TOTAL | 215.0 | 218.0 | 215.0 | 218.0 | 215.0 | 218.0 |

| | Compound Properties - Effect of xanthogen disulfide on blends of SSBR/BR/NR/N339 | | | | | |
|---|---|---|---|---|---|---|
| | A | B | C | D | E | F |
| Bound Rubber, %, 1st Stage | 39.9 | 73.7 | 46.4 | 62.2 | 36.3 | 57.8 |
| Cure Properties - Rheometer 160° C. | | | | | | |
| $M_H$–$M_L$, dNm | 27.5 | 25.7 | 29.0 | 25.5 | 25.7 | 24.4 |
| $T_s2$, min | 5.3 | 5.0 | 4.5 | 5.8 | 6.0 | 6.0 |
| T'50, min | 7.8 | 8.0 | 6.0 | 7.5 | 7.5 | 7.8 |
| T'90, min | 10.0 | 10.0 | 7.8 | 8.8 | 8.8 | 9.0 |
| Stress/Strain Properties - Cured 15' @ 160° C. | | | | | | |
| Modulus, Mpa | | | | | | |
| 5% Elongation | 0.30 | 0.19 | 0.24 | 0.21 | 0.14 | 0.12 |
| 100% Elongation | 2.55 | 2.96 | 2.00 | 2.34 | 1.25 | 1.31 |
| 300% Elongation | 12.82 | 18.05 | 10.47 | 14.33 | 6.34 | 8.41 |
| $M_{300}$/$M_5$ | 42.7 | 95.0 | 43.6 | 68.2 | 45.3 | 70.1 |
| Tensile, Mpa | 19.15 | 20.12 | 20.46 | 19.43 | 21.08 | 18.12 |
| % Elongation at break | 420 | 330 | 510 | 380 | 650 | 490 |
| Hardness Shore A | 66 | 62 | 62 | 57 | 51 | 46 |
| Dynamic Properties - Seiko | | | | | | |
| Tan δ, 11.7 Hz | | | | | | |
| T, ° C. | | | | | | |
| −20 | 0.719 | 1.029 | 0.678 | 0.772 | 0.611 | 0.785 |
| 0 | 0.448 | 0.494 | 0.480 | 0.461 | 0.358 | 0.347 |
| 20 | 0.375 | 0.323 | 0.409 | 0.346 | 0.276 | 0.223 |
| 70 | 0.264 | 0.174 | 0.317 | 0.211 | 0.184 | 0.107 |
| 100 | 0.224 | 0.133 | 0.281 | 0.167 | 0.158 | 0.080 |

As noted with N234, with N339 carbon black as the filler, the xanthogen disulfide also showed evidence of increased polymer-filler interaction as noted by increased levels of bound rubber and higher reinforcement factors associated with each xanthogen addition.

EXAMPLE 11

Use of Remills to Achieve Effective Use of Xanthogen Disulfide

This example demonstrates that the use of remills instead of an extended internal mixing pass can produce equivalent performance enhancement with the xanthogen disulfides. All ingredients were added in the first stage except for the curatives, so that the effect of remills could be isolated and compared to the extended mix stage.

| Compound Recipe - Use of remills to achieve effective use of xanthogen disulfide | | | | | |
|---|---|---|---|---|---|
| | Parts per hundred of rubber (phr) | | | | |
| | A | B | C | D | E |
| First Stage Ingredients | | | | | |
| SOLFLEX 1216 | 75.0 | 75.0 | 75.0 | 75.0 | 75.0 |
| BUDENE 1207 | 25.0 | 25.0 | 25.0 | 25.0 | 25.0 |
| N339 | 72.0 | 72.0 | 72.0 | 72.0 | 72.0 |
| Dibutyl xanthogen disulfide | — | 3.0 | 3.0 | 3.0 | 3.0 |
| SUNDEX 8125 | 32.5 | 32.5 | 32.5 | 32.5 | 32.5 |
| ZINC OXIDE | 2.5 | 2.5 | 2.5 | 2.5 | 2.5 |
| STEARIC ACID | 1.0 | 1.0 | 1.0 | 1.0 | 1.0 |
| SANTOFLEX 13 | 2.0 | 2.0 | 2.0 | 2.0 | 2.0 |
| BOWAX 615 | 1.5 | 1.5 | 1.5 | 1.5 | 1.5 |
| TOTAL | 211.5 | 214.5 | 214.5 | 214.5 | 214.5 |
| First Stage Mix | | | | | |
| Discharge Temperature, ° C. | 170 | 170 | 170 | 170 | 170 |
| Mix Time at Temperature, Min. | 0 | 3 | 0 | 0 | 0 |
| Number of Remills, Drop at 170° C. | 0 | 0 | 1 | 2 | 3 |
| Final Stage Ingredients | | | | | |
| TBBS | 1.5 | 1.5 | 1.5 | 1.5 | 1.5 |
| Sulfur 21-10 | 2.0 | 2.0 | 2.0 | 2.0 | 2.0 |
| TOTAL | 215.0 | 218.0 | 218.0 | 218.0 | 218.0 |

| Compound Properties - Use of remills to achieve effective use of xanthogen disulfide | | | | | |
|---|---|---|---|---|---|
| | A | B | C | D | E |
| Bound Rubber, %, 1st Stage | 44.9 | 73.7 | 60.5 | 61.6 | 53.5 |
| Bound Rubber, %, 1st REMILL | — | — | 69.6 | 63.4 | 66.0 |
| Bound Rubber, %, 2ND REMILL | — | — | — | 73.1 | 73.2 |
| Bound Rubber, %, 3RD REMILL | — | — | — | — | 73.9 |

-continued

Compound Properties - Use of remills to achieve effective use of xanthogen disulfide

|  | A | B | C | D | E |
|---|---|---|---|---|---|
| Cure Properties - Rheometer 160° C. | | | | | |
| $M_H$–$M_L$, dNm | 28.2 | 24.6 | 25.5 | 25.8 | 26.6 |
| $t_s2$, min | 4.8 | 4.5 | 4.3 | 5.0 | 4.8 |
| t'50, min | 7.0 | 7.0 | 7.0 | 7.3 | 7.3 |
| t'90, min | 9.3 | 9.0 | 9.3 | 9.3 | 9.3 |
| Mooney Scorch @ 135° C. | | | | | |
| $t_5$ | 11.6 | 8.0 | 6.1 | 8.5 | 9.6 |
| Stress Strain Properties –15' @ 160° C. | | | | | |
| Modulus, Mpa | | | | | |
| 5% Elongation | 0.41 | 0.32 | 0.33 | 0.30 | 0.29 |
| 100% Elongation | 2.55 | 3.24 | 3.03 | 3.10 | 3.24 |
| 300% Elongation | 11.71 | 17.09 | 15.85 | 16.60 | 16.74 |
| $M_{300}$/$M_5$ | 28.6 | 53.4 | 48.0 | 55.3 | 57.7 |
| Tensile, Mpa | 19.50 | 19.84 | 20.39 | 20.39 | 20.39 |
| % Elongation at break | 460 | 340 | 370 | 360 | 350 |
| Hardness Shore A | 70 | 65 | 66 | 66 | 65 |
| Die C Tear, Kn/m | 38.15 | 32.55 | 35.53 | 35.00 | 33.78 |
| Zwick Rebound, % | | | | | |
| Temperature, ° C. | | | | | |
| 0 | 18.6 | 17.8 | 18.6 | 18.3 | 18.6 |
| 21 | 33.3 | 36.4 | 35.8 | 36.4 | 36.6 |
| 70 | 49.5 | 56.8 | 55.8 | 56.6 | 56.8 |
| 100 | 57.0 | 64.2 | 63.3 | 64.2 | 64.2 |
| Dynamic Properties - SEIKO | | | | | |
| Tan δ, 11.8 Hz Temperature, ° C. | | | | | |
| −20 | 0.651 | 0.826 | 0.725 | 0.813 | 0.793 |
| 0 | 0.485 | 0.479 | 0.462 | 0.505 | 0.500 |
| 21 | 0.411 | 0.372 | 0.379 | 0.395 | 0.383 |
| 70 | 0.301 | 0.259 | 0.273 | 0.261 | 0.259 |
| 100 | 0.259 | 0.210 | 0.228 | 0.216 | 0.215 |
| Delta Tan δ, (0° C.–70° C.) | 0.184 | 0.220 | 0.189 | 0.244 | 0.241 |
| MTS - BFG Piezometer button, 10% Compression, 70° C., 12 Hz | | | | | |
| E', MPa, % Double Strain Amplitude | | | | | |
| 1 | 21.72 | 17.93 | 18.49 | 18.00 | 18.82 |
| 2 | 18.69 | 15.89 | 16.58 | 16.01 | 16.76 |
| 4 | 15.65 | 13.77 | 14.19 | 13.86 | 14.52 |
| 7 | 13.57 | 12.24 | 12.56 | 12.35 | 12.87 |
| 10 | 12.45 | 11.43 | 11.68 | 11.49 | 11.99 |
| 15 | 11.29 | 10.50 | 10.77 | 10.62 | 11.05 |
| 20 | 10.58 | 9.90 | 10.14 | 10.01 | 10.45 |
| 30 | 9.60 | 9.14 | 9.35 | 9.23 | 9.64 |
| % E' Retained | 44.2 | 51.0 | 50.6 | 51.3 | 51.2 |

EXAMPLE 12

Use of Xanthogen Disulfides in Truck Treads

This example demonstrates the use of dibutyl xanthogen disulfides in improving the high temperature hysteresis properties of NR and NR/BR rubber compound typical of conventional truck tire tread recipes.

Compound Recipe - Use of xanthogen disulfides in Truck treads

| | Parts per hundred of rubber (phr) | | | | | |
|---|---|---|---|---|---|---|
| | A | B | C | D | E | F |
| First Stage Ingredients | | | | | | |
| SIR 20 | 80.0 | 80.0 | 80.0 | 100.0 | 100.0 | 100.0 |
| BR 1203 | 20.0 | 20.0 | 20.0 | — | — | — |
| N234 | 50.0 | 50.0 | 50.0 | 50.0 | 50.0 | 50.0 |
| CPB | — | 3.0 | 3.0 | — | 3.0 | 3.0 |
| AROMATIC OIL | 4.0 | 4.0 | 4.0 | 4.0 | 4.0 | 4.0 |
| ZINC OXIDE | 4.0 | 4.0 | — | 4.0 | 4.0 | — |
| STEARIC ACID | 2.0 | 2.0 | — | 2.0 | 2.0 | — |
| AGE RESIN D | 2.0 | 2.0 | — | 2.0 | 2.0 | — |
| SANTOFLEX 13 | 2.0 | 2.0 | — | 2.0 | 2.0 | — |
| BOWAX 615 | 1.0 | 1.0 | — | 1.0 | 1.0 | — |
| TOTAL First Stage Mix | 165.0 | 168.0 | 157.0 | 165.0 | 168.0 | 157.0 |
| Discharge Temperature, ° C. | 340 | 340 | 340 | 340 | 340 | 340 |
| Mix Time at Temperature, Min. | 0 | 3 | 0 | 0 | 3 | 0 |
| Second Stage Ingredients | | | | | | |
| MB-1 | | | 157.0 | | | 157.0 |
| ZINC OXIDE | | | 4.0 | | | 4.0 |
| STEARIC ACID | | | 2.0 | | | 2.0 |
| AGE RESIN D | | | 2.0 | | | 2.0 |
| SANTOFLEX 13 | | | 2.0 | | | 2.0 |
| BOWAX 615 | | | 1.0 | | | 1.0 |
| TOTAL Second Stage Mix | | | 168.0 | | | 168.0 |
| Discharge Temperature, ° C. | — | — | 340 | — | — | 340 |
| Mix Time at Temperature, Min. | — | — | 3 | — | — | 3 |
| Third Stage Ingredients | | | | | | |
| MB-2 | 165.0 | 168.0 | 168.0 | 165.0 | 168.0 | 168.0 |
| Delac NS | 1.5 | 1.5 | 1.5 | 1.5 | 1.5 | 1.5 |
| Sulfur 21-10 | 1.5 | 1.5 | 1.5 | 1.5 | 1.5 | 1.5 |
| TOTAL | 168.0 | 171.0 | 171.0 | 168.0 | 171.0 | 171.0 |

| Compound Properties - Use of xanthogen disulfides in Truck treads | | | | | | |
|---|---|---|---|---|---|---|
| | A | B | C | D | E | F |
| Bound Rubber, %, 1st Stage | 47.1 | 70.0 | 44.7 | 55.9 | 74.7 | 50.7 |
| Cure Properties - Rheometer 160° C. | | | | | | |
| $M_H$–$M_L$, dNm | 39 | 38 | 38 | 38 | 37 | 38 |
| $T_s2$, min | 2.8 | 2.0 | 2.0 | 2.5 | 1.8 | 1.5 |
| T'50, min | 4.3 | 3.3 | 3.3 | 4.0 | 2.8 | 2.8 |
| T'90, min | 5.3 | 4.0 | 4.0 | 5.0 | 3.8 | 3.5 |
| Stress Strain Properties –15' @ 160° C. | | | | | | |
| Modulus, MPa | | | | | | |
| 5% Elongation | 0.32 | 0.31 | 0.34 | 0.35 | 0.30 | 0.28 |
| 100% Elongation | 2.89 | 3.03 | 3.17 | 3.24 | 3.03 | 3.10 |
| 300% Elongation | 15.23 | 17.43 | 18.53 | 16.81 | 17.91 | 18.67 |
| $M_{300}/M_5$ | 47.59 | 56.23 | 54.51 | 48.03 | 59.70 | 66.68 |
| Tensile, MPa | 27.42 | 20.74 | 21.43 | 30.59 | 25.15 | 26.46 |
| % Elongation at break | 490 | 340 | 330 | 520 | 400 | 400 |
| Hardness Shore A | 66 | 62 | 60 | 67 | 62 | 62 |
| Zwick Rebound, % | | | | | | |
| Temperature, ° C. | | | | | | |
| 0 | 35.8 | 39.5 | 39.6 | 29.8 | 30.3 | 32.9 |
| 21 | 52.6 | 58.7 | 58.7 | 49.4 | 53.4 | 56.6 |
| 70 | 65.4 | 70.9 | 71.2 | 64.7 | 69.7 | 72.1 |
| 100 | 70.6 | 75.9 | 76.4 | 70.2 | 73.7 | 77.3 |
| Dynamic Properties - SEIKO | | | | | | |
| Tan δ, 11.8 Hz | | | | | | |
| Temperature, ° C. | | | | | | |
| −20 | 0.403 | 0.392 | 0.413 | 0.435 | 0.538 | 0.467 |
| 0 | 0.267 | 0.226 | 0.234 | 0.302 | 0.285 | 0.246 |
| 21 | 0.211 | 0.161 | 0.171 | 0.250 | 0.200 | 0.167 |
| 70 | 0.163 | 0.096 | 0.104 | 0.195 | 0.116 | 0.087 |
| 100 | 0.138 | 0.074 | 0.079 | 0.169 | 0.086 | 0.060 |
| Delta Tan δ, (0° C.–70° C.) | 0.104 | 0.129 | 0.130 | 0.107 | 0.169 | 0.159 |
| MTS - BFG Flexometer button, 10% Compression, 70° C., 12 Hz | | | | | | |
| E', MPa, % Double Strain Amplitude | | | | | | |
| 1 | 12.2 | 10.6 | 10.3 | 12.5 | 10.2 | 9.5 |
| 2 | 11.3 | 10.0 | 9.8 | 11.5 | 9.7 | 9.1 |
| 4 | 10.2 | 9.4 | 9.2 | 10.4 | 9.0 | 8.5 |
| 7 | 9.4 | 8.9 | 8.7 | 9.6 | 8.5 | 8.1 |
| 10 | 9.0 | 8.6 | 8.4 | 9.0 | 8.14 | 7.8 |
| 15 | 8.5 | 8.2 | 8.0 | 8.5 | 7.8 | 7.5 |
| 20 | 8.1 | 7.9 | 7.7 | 8.2 | 7.5 | 7.2 |
| 30 | 7.7 | 7.6 | 7.4 | 7.7 | 7.1 | 6.9 |
| % E' Retained | 63.3 | 71.7 | 71.4 | 62.0 | 69.8 | 72.7 |

EXAMPLE 13

Effect of Xanthogen Disulfide on Tire Performance

This example demonstrates the use of dibutyl xanthogen disulfide in improving the properties of a SSBR/BR rubber compound and simultaneously improving treadwear, rolling resistance and wet traction when used as a tread rubber for tires. The mixing was performed in a laboratory BR Banbury. To simulate accepted passenger tire tread production mixing, the control compound was mixed using a conventional two-pass procedure. Note that the carbon black level in compound "C" was adjusted to compensate for pre-coated additive level

| Compound Recipe - Effect of xanthogen disulfide on tire performance | | | | | |
|---|---|---|---|---|---|
| | Parts per hundred of rubber (phr) | | | | |
| | A | B | C | D | E |
| First Stage Ingredients | | | | | |
| Solflex 1216 | 75.0 | 75.0 | 75.0 | 75.0 | 75.0 |
| Budene 1207 | 25.0 | 25.0 | 25.0 | 25.0 | 25.0 |
| Carbon Black, N234 | 72.0 | 72.0 | — | — | — |
| N234 (Example 1)* | — | — | 75.0 | — | — |
| Carbon Black Exp. #1 | — | — | — | 72.0 | — |
| Carbon Black Exp. #2 | — | — | — | — | 72.0 |

Compound Recipe - Effect of xanthogen disulfide on tire performance

| Parts per hundred of rubber (phr) | A | B | C | D | E |
|---|---|---|---|---|---|
| Sundex 8125 | 32.5 | 32.5 | 32.5 | 32.5 | 32.5 |
| Dibutyl xanthogen disulfide | — | 3.0 | — | 3.0 | 3.0 |
| Zinc Oxide | 2.5 | — | — | — | — |
| Stearic Acid | 1.0 | — | — | — | — |
| Flexzone 7P | 2.0 | — | — | — | — |
| Bowax 615 | 1.5 | — | — | — | — |
| TOTAL | 211.5 | 207.5 | 207.5 | 207.5 | 207.5 |
| First Stage Mix | | | | | |
| Discharge Temperature, °C. | 170 | 170 | 170 | 170 | 170 |
| Mix Time at Temperature, Min. | 0 | 5 | 5 | 5 | 5 |
| Second Stage Ingredients | | | | | |
| MB-1 | — | 207.5 | 207.5 | 207.50 | 207.5 |
| Zinc Oxide | — | 2.50 | 2.50 | 2.50 | 2.50 |
| Stearic Acid | — | 1.00 | 1.00 | 1.00 | 1.00 |
| Flexzone 7P | — | 2.00 | 2.00 | 2.00 | 2.00 |
| Bowax 615 | — | 1.50 | 1.50 | 1.50 | 1.50 |
| TOTAL | — | 214.5 | 214.5 | 214.5 | 214.5 |
| Third Stage Ingredients | | | | | |
| MB-2 | 211.5 | 214.5 | 214.5 | 214.5 | 214.5 |
| Delac NS | 1.50 | 1.50 | 1.50 | 1.50 | 1.50 |
| Sulfur 21-10 | 2.00 | 2.00 | 2.00 | 2.00 | 2.00 |
| TOTAL | 215.0 | 218.0 | 218.0 | 218.0 | 218.0 |

*pre-coated carbon black modified to 4 wt % blend to result in effective 3 phr xanthogen disulfide.

Compound Properties - Effect of xanthogen disulfide on tire performance

| | A | B | C | D | E |
|---|---|---|---|---|---|
| Bound Rubber, %, 1st Stage | 42.8 | 75.9 | 78.5 | 66.6 | 68.5 |
| Cure Properties - Rheometer 160° C. | | | | | |
| $M_H$–$M_L$, dNm | 32 | 29 | 30 | 28 | 27 |
| $t_s2$, min | 5.5 | 4.8 | 4.5 | 4.8 | 5.0 |
| t'50, min | 8.5 | 7.8 | 8.0 | 7.5 | 7.5 |
| t'90, min | 11.5 | 10.5 | 10.8 | 10.8 | 10.8 |
| Mooney Scorch @ 135° C. | | | | | |
| $t_5$ | 15.8 | 9.7 | 6.0 | 9.0 | 8.7 |
| Stress Strain Properties –15' @ 160° C. | | | | | |
| Modulus, Mpa | | | | | |
| 5% Elongation | 0.35 | 0.28 | 0.24 | 0.23 | 0.24 |
| 100% Elongation | 2.63 | 2.98 | 3.18 | 2.35 | 2.08 |
| 300% Elongation | 12.87 | 18.27 | 19.38 | 14.19 | 13.29 |
| $M_{300}$/$M_5$ | 36.77 | 65.25 | 80.75 | 61.70 | 55.36 |
| Tensile, Mpa | 18.89 | 20.28 | 20.28 | 17.37 | 19.52 |
| % Elongation at break | 420 | 320 | 310 | 350 | 390 |
| Hardness Shore A | 65 | 63 | 66 | 60 | 61 |
| Die C Tear, kN/m | 38.5 | 33.0 | 31.7 | 31.7 | 33.0 |
| BFG Heat Build Up, °C. | 25 | 18 | 16 | 15 | 16 |

Compound Properties - Effect of xanthogen disulfide on tire performance

| | A | B | C | D | E |
|---|---|---|---|---|---|
| Zwick Rebound, % | | | | | |
| Temperature, °C. | | | | | |
| 0 | 21.2 | 19.7 | 19.5 | 19.6 | 19.6 |
| 21 | 35.4 | 42.8 | 43.7 | 45.2 | 43.5 |
| 70 | 52.2 | 63.1 | 62.8 | 64.5 | 62.8 |
| 100 | 59.5 | 70.0 | 69.7 | 70.5 | 69.0 |
| Dynamic Properties - SEIKO | | | | | |
| Tan δ, 11.8 Hz Temperature, °C. | | | | | |
| –20 | 0.553 | 0.805 | 0.799 | 0.855 | 0.807 |
| 0 | 0.371 | 0.439 | 0.427 | 0.431 | 0.435 |
| 21 | 0.333 | 0.323 | 0.301 | 0.301 | 0.317 |
| 70 | 0.273 | 0.206 | 0.179 | 0.175 | 0.203 |
| 100 | 0.244 | 0.163 | 0.138 | 0.140 | 0.165 |
| Delta Tan δ, (0° C.–70° C.) | 0.098 | 0.233 | 0.248 | 0.256 | 0.232 |
| MTS - BFG Flexometer button, 10% Compression, 70° C., 12 Hz | | | | | |
| E', MPa, % Double Strain Amplitude | | | | | |
| 1 | 18.73 | 16.10 | 14.37 | 12.95 | 13.70 |
| 2 | 16.33 | 14.56 | 13.17 | 12.11 | 12.78 |
| 4 | 13.99 | 12.94 | 11.89 | 11.15 | 11.54 |
| 7 | 12.28 | 11.79 | 10.87 | 10.26 | 10.57 |
| 10 | 11.34 | 11.06 | 10.28 | 9.77 | 10.01 |
| 15 | 10.40 | 10.30 | 9.65 | 10.30 | 9.40 |
| 20 | 9.79 | 9.79 | 9.20 | 8.80 | 8.98 |
| 30 | 9.00 | 9.12 | 8.66 | 8.28 | 8.37 |
| % E' Retained | 48.0 | 56.6 | 60.3 | 64.0 | 61.1 |
| Din Abrasion Index | 100 | 116 | 108 | 106 | 106 |

TIRE TESTING

Treadwear:

Rubber compounds were prepared and cured using a proprietary Continental Carbon Company tread design. Treadwear was measured on dry interstate highway and hill roads in central Texas, USA using multi-section P195/75R14 cold-cap Bandag retreaded tires prepared from new steel belted radial tire casings. A 0.635 cm deep tread design allowed depth to be measured at 20 precisely located points per section to determine the wear profile during the road test. The relative treadwear index to control is outlined below measured after 16,000 km at a target severity of 12,700 km/mm (or 200 miles/mil).

Rolling Resistance:

Tires were prepared similarly as described above, wherein each section is of the same rubber compound. Rolling resistance of these tires were determined by protocol outlined in SAE Recommended Practice SAE J1269 MAR87. This feature's testing at two loads (1260 and 700 lbs. or 5607 and 3115 N) and at two inflation pressures (30 and 45 psi or 207 and 310 kPa). The indices shown are from the average of these 4 conditions.

Wet Traction:

Tires were prepared as those described used in rolling resistance testing. The testing protocol is based on ASTM F408-86, a standard test method for tires for wet traction in straight ahead breaking using a towed trailer. The standard test conditions measure the peak and slide resistance at two speeds; 32.2 and 96.6 km/hr (20 and 60 mph). For this testing another speed of 64.4 km/hr (40 mph) was added. The indices were the average of the 6 conditions.

Test Results Indexed to Control (higher is better):

| | Sample ID | | | | |
|---|---|---|---|---|---|
| | A<br>N234<br>CNTL | B<br>N234 +<br>CPB | C<br>N234-<br>COATED | D<br>CB EXP#1 +<br>CPB | E<br>CB EXP#2 +<br>CPB |
| Treawear Index | 100 | 114 | 112 | 113 | 118 |
| Rolling Resistance Index | 100 | 109 | 112 | 115 | 109 |
| Wet Traction Index | 100 | 104 | 106 | 97 | 103 |

EXAMPLE 14

This example illustrates the improved processing properties when rubber is mixed with carbon black and XDS as opposed to those obtained when XDS is mixed with the rubber alone and the carbon black is added later.

In the data that follows, Column A is a control with no xanthogen added. Column B is the comparative example in which xanthogen is added to the rubber alone and mixed at an elevated temperature, and the carbon added in a subsequent mixing step. Column C is the example mixed according to our procedure, where rubber, xanthogen and carbon black are mixed in the same step. In these Tables, CPB refers to dibutyl xanthogen disulfide.

The first Table that follows show the recipes and mixing procedures. The second Table shows the processing properties and cured properties.

The lowest set of numbers, tan δ, is a measure of hysteresis. A lower value is more favorable. The data shows that the C compound is better than B, especially at strains of 5–14%.

In the middle of the page, Mooney Scorch MC @ 135° C., shows the Mooney Scorch Time in minutes. Mooney Scorch Time is a measure of the processing safety of the uncured compound, that is the time it may be worked at a given temperature before it cures to the point of being unprocessable. A larger number is more favorable. The data shows that in either case the addition of xanthogen decreases scorch safety, but there is a distinct advantage to the C compound which has a 35% longer scorch time.

Just above is a line labeled Mooney Viscosity—ML 1'+4' @ 100° C. This refers to the viscosity of the uncured rubber compound and is a measure of how difficult it is to be mixed, extruded or shaped prior to curing. The higher the number the more difficult it is to process, so in this case a low value is favorable.

The data shows that in the case of the compound in column C, mixed according to our procedure, the Mooney Viscosity is practically unchanged compared to the Control A, while in the case of Column B, with xanthogen added to the rubber first, there is a dramatic increase, making this material much more difficult to process.

| | MB-1 |
|---|---|
| SOLFLEX 1216 | 75.00 |
| BUDENE 1207 | 25.00 |
| CPB | 3.00 |
| TOTAL | 103.00 |

Mixing:
MB-1 Bring temperature up to 340° F., hold 3 minutes and discharge

| | A | B | C |
|---|---|---|---|
| MB-1 | 0.00 | 103.00 | 0.00 |
| SOLFLEX 1216 | 75.00 | 0.00 | 75.00 |
| BUDENE 1207 | 25.00 | 0.00 | 25.00 |
| N234 | 72.00 | 72.00 | 72.00 |
| SUNDEX 8125 | 32.50 | 32.50 | 32.50 |
| CPB | 0.00 | 0.00 | 3.00 |
| TOTAL | 204.50 | 207.50 | 207.50 |

Mixing:
MB-A-B Bring temperature up to 320° F. and discharge.
MB-C Bring temperature up to 340° F., hold 3 minutes and discharge

| | | | |
|---|---|---|---|
| MB-A | 240.50 | 0.00 | 0.00 |
| MB-B | 0.00 | 207.50 | 0.00 |
| MB-C | 0.00 | 0.00 | 207.50 |
| ZINC OXIDE | 2.50 | 2.50 | 2.50 |
| STEARIC ACID | 1.00 | 1.00 | 1.00 |
| FLEXZONE 7P | 2.00 | 2.00 | 2.00 |
| BOWAX 615 | 1.50 | 1.50 | 1.50 |
| TOTAL | 211.50 | 214.50 | 214.50 |
| MB | 211.50 | 214.50 | 214.50 |
| DELAC NS | 1.50 | 1.50 | 1.50 |
| SULFUR 21-10 | 2.00 | 2.00 | 2.00 |
| TOTAL | 215.00 | 218.00 | 218.00 |
| MB-1(CPB) | 0.00 | 103.00 | 0.00 |
| SOLFLEX 1216 | 75.00 | 0.00 | 75.00 |
| BUDENE 1207 | 25.00 | 0.00 | 25.00 |
| CPB | 0.00 | 0.00 | 3.00 |

Rheometer - MDR 2000 @ 160 C.

| | | | |
|---|---|---|---|
| ML | 7.70 | 9.81 | 8.55 |
| MH | 34.83 | 36.19 | 35.00 |
| Ts2 | 5.74 | 4.30 | 4.52 |
| t50 | 8.35 | 7.23 | 7.95 |
| t90 | 11.06 | 10.67 | 11.10 |

Mooney Viscosity - ML 1' + 4' @ 100° C.

| | | | |
|---|---|---|---|
| | 77 | 99 | 76 |

Mooney Scorch MS @ 135° C.

| | | | |
|---|---|---|---|
| t3 | 21' | 11' | 15' |

Stress/Strain

| | | | |
|---|---|---|---|
| Cure times @ 160° C. | 15' | 15' | 15' |
| 100% Mod. Mpa | 2.2 | 2.8 | 2.8 |
| 300% Mod. Mpa | 11.3 | 15.7 | 15.0 |
| Tensile Mpa | 18.7 | 17.7 | 19.1 |
| % Elongation | 450 | 340 | 360 |
| Hardness Shore A | 60 | 60 | 60 |

RPA 2000 @ 60° C., 10 Hz Tan Delta
% Strain

| | | | |
|---|---|---|---|
| 0.7 | 0.13 | 0.113 | 0.117 |
| 1 | 0.153 | 0.143 | 0.131 |
| 2 | 0.213 | 0.185 | 0.183 |
| 5 | 0.262 | 0.224 | 0.213 |
| 7 | 0.261 | 0.226 | 0.208 |
| 14 | 0.247 | 0.215 | 0.199 |

We claim:

1. The process of producing an unvulcanized rubber masterbatch useful for producing vulcanized rubber with improved hysteresis, which comprises mixing a composition consisting of unvulcanized rubber, carbon black, xanthogen polysulfide, optionally a processing oil, and optionally, one or more fillers, at a temperature of 149° C. or higher in a non-productive stage.

2. The process of claim 1 wherein mixing is carried out at a temperature of at least 160° for at least three minutes.

3. The process of claim 1 wherein mixing is carried out by multiple re-mills.

4. The process of claim 1 wherein at least part of the xanthogen polysulfide is coated on at least part of the carbon black.

5. The process of claim 1 wherein the xanthogen polysulfide comprises xanthogen disulfide having the structure:

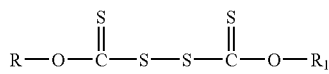

wherein R and $R_1$ are independently alkyl groups.

6. The process of claim 5 wherein the alkyl groups R and $R_1$ are butyl.

7. The process of claim 1 wherein the xanthogen polysulfide is present in a concentration of 0.1 to 100 parts by weight per 100 parts by weight carbon black.

8. The process of claim 1 wherein said composition comprises silica.

9. A composition suitable for producing unvulcanized rubber useful for producing vulcanized rubber with improved hysteresis, which consists of unvulcanized rubber, carbon black, xanthogen polysulfide, optionally, a processing oil, and optionally, one or more fillers.

10. The composition of claim 9 wherein at least part of the xanthogen polysulfide is coated on at least part of the carbon black.

11. The composition of claim 10 wherein the xanthogen polysulfide comprises xanthogen disulfide having the structure:

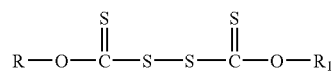

wherein R and $R_1$ are independently alkyl groups.

12. The composition of claim 11 wherein R and $R_1$ are butyl groups.

13. The composition of claim 10 wherein the xanthogen polysulfide is present in a concentration of 0.5 to 20 parts by weight per 100 parts by weight filler.

14. The composition of claim 13 wherein the one or more fillers is silica.

15. The process of producing vulcanized rubber with improved hysteresis (1) which comprises mixing a composition consisting of unvulcanized rubber, carbon black, xanthogen polysulfide, optionally, a processing oil, and optionally, one or more fillers, at a temperature of 149° C. or higher, in a non-productive mixing step, then (2) adding curative ingredients in subsequent mixing steps and vulcanizing the rubber.

16. The process of claim 15 wherein step (1) is carried out at a temperature of at least 160° C. for at least three minutes.

17. The process of claim 15 wherein at least part of the xanthogen polysulfide is coated on at least part of the carbon black.

18. The process of claim 15 wherein the one or more fillers is silica.

* * * * *